United States Patent
Soccorsy

(10) Patent No.: US 11,079,919 B1
(45) Date of Patent: Aug. 3, 2021

(54) PERSONAL COMPUTING DEVICES WITH IMPROVED GRAPHICAL USER INTERFACES

(71) Applicant: Wells Fargo Bank, N.A., San Francisco, CA (US)

(72) Inventor: Benjamin Soccorsy, Larkspur, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 38 days.

(21) Appl. No.: 16/407,739

(22) Filed: May 9, 2019

Related U.S. Application Data

(60) Provisional application No. 62/669,494, filed on May 10, 2018.

(51) Int. Cl.
*G06F 3/0484* (2013.01)
*G06F 3/0488* (2013.01)
(Continued)

(52) U.S. Cl.
CPC ........ *G06F 3/04847* (2013.01); *G06F 3/0482* (2013.01); *G06F 3/04883* (2013.01); *G06Q 20/0457* (2013.01); *G06Q 20/102* (2013.01); *G06Q 20/3221* (2013.01); *G06Q 20/3223* (2013.01)

(58) Field of Classification Search
CPC ... G06F 3/04812; G06F 3/0488; G06Q 30/06; G06Q 40/02; G06Q 20/10; G06Q 40/00
See application file for complete search history.

(56) References Cited

U.S. PATENT DOCUMENTS

D424,036 S    5/2000   Arora et al.
D438,873 S    3/2001   Wang et al.
(Continued)

OTHER PUBLICATIONS

"15 Best Responsive & Mobile-Friendly jQuery Slider Plugins" Jan. 8, 2014, posted at 365webresources.com, [site visited Oct. 31, 2019]. https://web.archive.org/web/201401982413/https://365webresources.com/15-best-responsive-mobile-friendly-jquery-slider-plugins. 2 pages.

(Continued)

*Primary Examiner* — Steven P Sax
(74) *Attorney, Agent, or Firm* — Foley & Lardner LLP

(57) ABSTRACT

A user device includes a touchscreen and an application circuit. The application circuit is structured to provide, on the touchscreen, a graphical user interface. The graphical user interface includes a transferor account widget that identifies the transferor account and a transferee account widget that identifies a transferee account. The transferor account widget is positioned proximate a first edge of the touchscreen and the transferee account widget is positioned proximate a second edge of the touchscreen. The graphical user interface also includes a slider feature positioned between the transferor account widget and the transferee account widget. The slider feature has an origin and a goal. The application circuit is also structured to detect a slide of a user input member on the touchscreen from the origin to the goal, and, in response, initiate a transfer of funds from the transferor account to the transferee account.

8 Claims, 20 Drawing Sheets

(51) Int. Cl.
 *G06F 3/0482* (2013.01)
 *G06Q 20/04* (2012.01)
 *G06Q 20/32* (2012.01)
 *G06Q 20/10* (2012.01)

(56) References Cited

U.S. PATENT DOCUMENTS

| | | |
|---|---|---|
| D545,840 S | 7/2007 | Haldimann |
| D558,221 S | 12/2007 | Nagata et al. |
| D580,946 S | 11/2008 | Chen et al. |
| 7,797,226 B2 | 9/2010 | Ram et al. |
| 7,864,163 B2 | 1/2011 | Ording et al. |
| D637,199 S | 5/2011 | Brinda et al. |
| 7,956,845 B2 | 6/2011 | Lee |
| D641,372 S | 7/2011 | Gardner et al. |
| D643,438 S | 8/2011 | Gardner et al. |
| 8,156,015 B1 | 4/2012 | Gaw |
| D660,864 S | 5/2012 | Anzures et al. |
| 8,255,323 B1 | 8/2012 | Casey et al. |
| D670,722 S | 11/2012 | Yang et al. |
| D673,168 S | 12/2012 | Frijlink et al. |
| D678,315 S | 3/2013 | Chang |
| D682,297 S | 5/2013 | Dijulio et al. |
| D682,877 S | 5/2013 | Hartley |
| 8,554,280 B2 | 10/2013 | Patel et al. |
| 8,650,096 B2 | 2/2014 | Van Buskirk et al. |
| 8,651,373 B1 | 2/2014 | Block et al. |
| D701,227 S | 3/2014 | Lee |
| 8,666,895 B2 | 3/2014 | Grigg et al. |
| D705,244 S | 5/2014 | Arnold et al. |
| D716,338 S | 10/2014 | Lee |
| 8,892,467 B1 * | 11/2014 | Ball ................ G06Q 40/00 705/36 R |
| D725,145 S | 3/2015 | Matthew |
| D737,311 S | 8/2015 | Ma |
| D738,394 S | 9/2015 | Chaudhri et al. |
| D738,400 S | 9/2015 | Bang |
| D741,340 S | 10/2015 | Hall |
| D743,999 S | 11/2015 | Villamor et al. |
| 9,183,490 B2 | 11/2015 | Moreton et al. |
| 9,189,070 B2 | 11/2015 | Yamaguchi et al. |
| D745,550 S | 12/2015 | Sanderson |
| D746,866 S | 1/2016 | Memoria et al. |
| D747,336 S | 1/2016 | Carrigan et al. |
| D749,622 S | 2/2016 | Chaudhri et al. |
| D750,113 S | 2/2016 | Kettner et al. |
| 9,288,610 B2 | 3/2016 | Son et al. |
| D753,676 S | 4/2016 | Oh et al. |
| D755,192 S | 5/2016 | Gardner et al. |
| D755,830 S | 5/2016 | Chaudhri et al. |
| D761,818 S | 7/2016 | Jung et al. |
| D762,239 S | 7/2016 | Seo |
| D763,286 S | 8/2016 | Bradbury et al. |
| D763,896 S | 8/2016 | Chaudhri |
| D764,520 S | 8/2016 | Lee et al. |
| D766,917 S | 9/2016 | Kwon et al. |
| D769,892 S | 10/2016 | Anzures et al. |
| D770,469 S | 11/2016 | Carlson |
| D770,475 S | 11/2016 | Choi et al. |
| D772,249 S | 11/2016 | Choi et al. |
| D772,278 S | 11/2016 | Chaudhri et al. |
| 9,483,758 B2 | 11/2016 | Rhee et al. |
| D773,502 S | 12/2016 | Park et al. |
| D776,134 S | 1/2017 | Kim et al. |
| 9,547,854 B2 | 1/2017 | Serrano |
| D778,942 S | 2/2017 | Coffman |
| 9,582,813 B2 | 2/2017 | Greenberg et al. |
| D780,781 S | 3/2017 | Ding et al. |
| D781,311 S | 3/2017 | Rad et al. |
| D783,652 S | 4/2017 | Guan et al. |
| D784,409 S | 4/2017 | Kim |
| 9,626,716 B1 | 4/2017 | Gaw |
| D787,527 S | 5/2017 | Wilberding |
| 9,652,758 B2 | 5/2017 | Zhou et al. |
| 9,659,293 B2 | 5/2017 | Dunwoody |
| D789,956 S | 6/2017 | Ortega et al. |
| D791,786 S | 7/2017 | Chaudhri et al. |
| D791,814 S | 7/2017 | Chaudhri |
| D792,454 S | 7/2017 | Baumez |
| D793,424 S | 8/2017 | Bao et al. |
| D795,921 S | 8/2017 | Bhatti et al. |
| 9,729,555 B2 | 8/2017 | Ferguson |
| D796,525 S | 9/2017 | Kim et al. |
| D798,318 S | 9/2017 | Ferguson |
| D798,331 S | 9/2017 | Fong et al. |
| 9,767,448 B2 | 9/2017 | Serrano |
| D798,896 S | 10/2017 | Chaudhri |
| D801,380 S | 10/2017 | Yamasaki |
| 9,785,241 B2 | 10/2017 | Mason |
| D802,011 S | 11/2017 | Friedman et al. |
| D802,607 S | 11/2017 | Apodaca et al. |
| D802,625 S | 11/2017 | Fox |
| D804,521 S | 12/2017 | Deets, Jr. |
| 9,842,330 B1 | 12/2017 | Van Os et al. |
| D806,717 S | 1/2018 | Bae et al. |
| D807,907 S | 1/2018 | Dellinger et al. |
| 9,864,984 B2 | 1/2018 | Khan et al. |
| D809,522 S | 2/2018 | Mizono et al. |
| D812,639 S | 3/2018 | Storm et al. |
| D816,110 S | 4/2018 | Choi et al. |
| D817,341 S | 5/2018 | Jeon et al. |
| D820,850 S | 6/2018 | Tekamp et al. |
| D823,319 S | 7/2018 | Adriaensen |
| D828,388 S | 9/2018 | Bao et al. |
| D828,849 S | 9/2018 | Holmgren |
| D829,767 S | 10/2018 | Schaper et al. |
| D831,683 S | 10/2018 | Ghosh |
| D832,301 S | 10/2018 | Smith |
| D833,466 S | 11/2018 | Knoop |
| D836,121 S | 12/2018 | Leong et al. |
| D837,249 S | 1/2019 | Barthold |
| D841,047 S | 2/2019 | Papolu |
| D842,882 S | 3/2019 | Bachman et al. |
| 10,263,802 B2 | 4/2019 | Burns et al. |
| D847,854 S | 5/2019 | Christian et al. |
| D849,027 S | 5/2019 | Rocha et al. |
| D849,037 S | 5/2019 | Li et al. |
| D849,046 S | 5/2019 | Keo et al. |
| D849,757 S | 5/2019 | Jing et al. |
| D854,038 S | 7/2019 | Kirsanov et al. |
| D855,068 S | 7/2019 | Kirsanov et al. |
| D868,804 S | 12/2019 | Bragdon |
| D868,808 S | 12/2019 | Hopper et al. |
| D882,627 S | 4/2020 | Zhu et al. |
| D887,424 S | 6/2020 | Fukushima et al. |
| D888,742 S | 6/2020 | Leong et al. |
| D895,642 S | 9/2020 | Hoofnagle et al. |
| D913,299 S | 3/2021 | Sakurai et al. |
| 2002/0163544 A1 | 11/2002 | Baker et al. |
| 2003/0020760 A1 | 1/2003 | Takatsu et al. |
| 2004/0222973 A1 | 11/2004 | Stanhope et al. |
| 2008/0187248 A1 | 8/2008 | Ikeda et al. |
| 2009/0204538 A1 | 8/2009 | Ley |
| 2009/0271723 A1 | 10/2009 | Matsushima et al. |
| 2009/0293007 A1 | 11/2009 | Duarte et al. |
| 2009/0313578 A1 | 12/2009 | Roh et al. |
| 2010/0125495 A1 * | 5/2010 | Smith ............... G06Q 30/0601 705/14.23 |
| 2010/0268629 A1 * | 10/2010 | Ross ................. G06Q 10/10 705/35 |
| 2010/0277496 A1 | 11/2010 | Kawanishi et al. |
| 2011/0178902 A1 * | 7/2011 | Imrey .............. G06Q 40/00 705/30 |
| 2011/0302532 A1 | 12/2011 | Missig |
| 2012/0136780 A1 | 5/2012 | El-Awady et al. |
| 2012/0143751 A1 * | 6/2012 | Kravec ............. G06Q 20/10 705/41 |
| 2012/0209749 A1 | 8/2012 | Hammad et al. |
| 2012/0284143 A1 * | 11/2012 | Hunter ............. G06Q 30/0601 705/26.4 |
| 2013/0132856 A1 | 5/2013 | Binyamin et al. |
| 2013/0254709 A1 | 9/2013 | Koshimae et al. |
| 2013/0254717 A1 | 9/2013 | Al-Ali et al. |

(56) References Cited

U.S. PATENT DOCUMENTS

| | | | |
|---|---|---|---|
| 2013/0339219 A1* | 12/2013 | Bernheimer | G06Q 40/025 705/38 |
| 2014/0040128 A1 | 2/2014 | Park | |
| 2014/0223329 A1 | 8/2014 | Falaki et al. | |
| 2014/0283142 A1 | 9/2014 | Shepherd et al. | |
| 2014/0316942 A1 | 10/2014 | Mengerink et al. | |
| 2014/0372268 A1* | 12/2014 | Hazam | G06Q 20/108 705/35 |
| 2014/0372269 A1* | 12/2014 | Ternan | G06Q 40/00 705/35 |
| 2015/0019421 A1 | 1/2015 | Low et al. | |
| 2015/0081395 A1* | 3/2015 | Katz | G06Q 30/0269 705/7.35 |
| 2015/0081544 A1 | 3/2015 | Schulz et al. | |
| 2015/0212684 A1 | 7/2015 | Sabia et al. | |
| 2015/0262183 A1* | 9/2015 | Gervais | G06Q 20/405 705/44 |
| 2015/0346994 A1 | 12/2015 | Chanyontpatanakul | |
| 2016/0104219 A1 | 4/2016 | Greenberg et al. | |
| 2016/0132867 A1 | 5/2016 | Raja | |
| 2016/0300196 A1 | 10/2016 | Guido et al. | |
| 2016/0357403 A1 | 12/2016 | Chang et al. | |
| 2016/0371691 A1 | 12/2016 | Kang et al. | |
| 2017/0039535 A1 | 2/2017 | Park et al. | |
| 2017/0046325 A1 | 2/2017 | Jitkoff et al. | |
| 2017/0061420 A1 | 3/2017 | Serrano | |
| 2017/0147199 A1 | 5/2017 | Son et al. | |
| 2017/0178110 A1* | 6/2017 | Swanson | G06Q 20/227 |
| 2017/0270598 A1 | 9/2017 | Ram et al. | |
| 2018/0018595 A1* | 1/2018 | Scott | G06Q 20/0457 |
| 2018/0081528 A1* | 3/2018 | Chan | G06F 3/04847 |
| 2018/0107372 A1* | 4/2018 | Van Damme | G06F 3/0486 |
| 2018/0225748 A1* | 8/2018 | Selcuk | G06Q 30/0601 |
| 2018/0322109 A1 | 11/2018 | Woods | |

OTHER PUBLICATIONS

"How to make an image slider". Mar. 2017, posted at forums.xamarin.com, [site visited Oct. 31, 2019]. https://fourms.xamarin.com/discussion/90627/how-to-make-an-image-slider. 1 page.

Hart, Clark, "Swipe Right to Like Dating Apps are Ruining all the Fun" Feb. 9, 2018, posted at the londoneconomic.com, [site visited Oct. 31, 2019]. https://thelondoneconomic.com/liefstyle/swipe-right-like-dating-apps-ruining-fun/10/03/?doing_wp-cron=1572545097.6404809951782226562500. 2 pages.

Raj, Divan, "Swipe& Delete interaction" Apr. 30, 2017, posted at dribble.com (site visited Oct. 31, 2019). https://dribbble.com/shots/3467119-Swipe-delete-interaction. 1 page.

Wells Fargo, "Wells Fargo Reimagines Mobile Experience with 'Pay with Wells Fargo'", May 10, 2018. https://www.youtube.com/watch?v=wwZFIZQzN5Q; screenshots 67 pages.

"Arrow, arrows, giveway, way, zigzag icon" Nov. 28, 2015, posted at iconfinder.com, [site visited Jan. 27, 2021]. https://www.iconfinder.com/icons/804959/arrow_arrows_giveway_way_zigzag_icon (Year: 2015).

"Auto Insurance App" Aug. 1, 2016, posted at dribble.com, [site visited Jan. 27, 2021]. https://dribbble.com/shots/2895164-Auto-Insurance-App (Year: 2016).

"Currency exchange icon. Banking transfer sign . . . " Jul. 20, 2015, posted at shutterstock.com, [site visited Jan. 27, 2021]. https://www.shutterstock.com/image-vector/currency-exchange-icon-banking-transfer-sign-296638154 (Year: 2015).

"Money icon with arrows . . . " Sep. 9, 2020, posted at gettyimages.com, [site visited Jan. 27, 2021]. https://www.gettyimages.com/detaiL/illustration/money-icon-with-arrows-capital-decrease-and-royalty-free-illustration/ 1205172979 (Year: 2020).

Khan, Imran, "Mobile Bank App Concept with Animated Prototype—Send Money" Jun. 20, 2017, posted at dribbble.com, [site visited Jan. 27, 2021]. https://dribbble.com/shots/3579626-Mobile-Bank-App-Concept-with-Animated-Prototype-Send-Money (Year: 2017).

"A simple Slide to Unlock Material widget for Android" May 8, 2018, posted at androidexample365.com, [site visited Mar. 29, 2021]. https://and_roidexample365.com/a-simple-slide-to-unlock-material-widget-for-and_raid (Year: 2018).

"Check, mark, menu, nav, navigation, ok icon" Dec. 2, 2015, posted at iconfinder.com, [site visited Mar. 4, 2021]. https://www.iconfinder.com/icons/810599/check_mark_menu_nav_navigation_ok_icon (Year: 2015).

"HiAppHere_com_freedom.musicplayer.png" Aug. 5, 2017, posted at dl.hiapphere.com, [site visited Mar. 4, 2021]. https://web.archive.org/web/20170805105607/http://dl.hiapphere.com/data/icon/201605/HiAppHere_com_freedom.musicplayer.png (Year: 2017).

"iOS inspired Toggle Switch for Angular" Jan. 20, 2017, posted at angularscript.com, [site visited Mar. 29, 2021]. https://angularscript.com/ios-inspired-toggle-switch-angular (Year: 2017).

"JavaFX Canvas" Sep. 23, 2015, posted at zetcode.com, [site visited Mar. 31, 2021]. https://web.archive.org/web/20150923004455/https://zetcode.com/gui/javafx/canvas (Year: 2015).

"Set of check mark icons. Tick and cross icons" Jul. 15, 2016, posted at bigstockphoto.com, [site visited Mar. 4, 2021]. http (Year: 2016).

Anderson, J. Riley, "Slider Lighting" Dec. 5, 2012, posted at dribbble.com, [site visited Mar. 29, 2021]. https://dribbble.com/shots/845877—Gif-Slider-Lighting (Year: 2012).

Beargie, Mike, "FileMaker's card window: What you need to know" May 9, 2017, posted at gomainspring.com, [site visited Mar. 30, 2021]. https://gomainspring.com/filemaker-community/filemakers-card-window-what-you-need-to-know (Year: 2017).

Eichelberg, Amy, "Android App of the Day: APP Lock" Apr. 20, 2012, posted at theunlockr.com, [site visited Mar. 31, 2021]. https://theunlockr.com/android-app-of-the-day-app-lock (Year: 2012).

Keskin, M. Kerem, "IBDesignable custom vertical Slider on iOS" Feb. 19, posted at medium.com, [site visited Mar. 30, 2021]. https://medium.com/@mkeremkeskin/ibdesignable-custom-vertical-slider-on-ios-f0169c2d1bdb (Year: 2018).

"Ibotta Coupon App Rating Popup" Feb. 21, 2015, posted at beautifulpopups.wordpress.com, [site visited May 26, 2021]. https://beautifulpopups.wordpress.com/2015/02/21/ibotta-coupon-app-rating-popup (Year: 2015).

Chalubek, Jedrzej, "Glide.js—Simple, responsive and fastjquery carousel slider" Aug. 3, 2015, posted at dribbble.com, [site visited May 26, 2021]. https://dribbble.com/shots/2178325-Glide-js-Simple-responsive-and-fast-jquery-carousel-slider (Year: 2015).

* cited by examiner

PERSONAL COMPUTING DEVICES WITH IMPROVED GRAPHICAL USER INTERFACES

CROSS-REFERENCE TO RELATED APPLICATION

This application claims the benefit of and priority to U.S. Provisional Patent Application No. 62/669,494 filed May 10, 2018, the entire disclosure of which is incorporated by reference herein.

TECHNICAL FIELD

The present disclosure relates generally to the field of personal computing devices and, more particularly, to improved graphical user interfaces for personal computing devices by providing enhanced functionalities, aesthetics, and ease of use.

BACKGROUND

Personal computing devices such as smartphones, tablets, portable gaming systems, personal digital assistants, etc. typically have small touch-sensitive screens (touchscreens) that can only present a limited amount of graphical content at a time and receive limited inputs from a user. Even where small screens include a large number of pixels to present high definition graphics, bounds on human perception and dexterity limit the types of interactions a person can have with a small touchscreen. For example, one of the problems facing designers of personal computing devices is how to allow the user to quickly and efficiently provide access to various data and functions, and allow the user to input data and commands relating to those functions, without overcrowding a single view or requiring navigation between many views and applications. Even within one category of functions that may be carried out using a personal computing device, for example the transfer and management of assets, users often need to open multiple separate applications and navigate between views of each of those multiple applications to access relevant data and carry out desired actions. The multiple separate applications often have different layouts, arrangements of data, navigation structures, and input fields, leading to disjointed, inefficient, and confusing user experiences, while also consuming computing resources by running simultaneously. Furthermore, due in part to small screen size, key data relevant to a user's decision to input a command to the personal computing device may often not be presented on the screen simultaneously with a user-selectable option to input the command.

Another problem facing designers of personal computing devices is how to allow a user to input a command in an intuitive way while minimizing the risk of accidental commands, which may be common on small touchscreens. One common graphical user interface object that allows a user to input a command on a small touchscreen is a graphical button, which can be tapped to input a command represented by that button. Such buttons are often pressed accidentally, for example due to proximity to other interactive features compressed nearby on a small touchscreen and/or the ease of engaging such buttons through unintentional touches of the touchscreen. In some cases, accidental inputs are made more common by inconsistencies between different applications with similar functions (e.g., when the location of a "cancel transaction" button in one application is in the same location on the touchscreen as a "send money" button in another application).

When the command corresponds to a significant action that cannot easily be undone, such as a transfer of money, minimizing the risk of accidental inputs is an important technical challenge. Conventional approaches to this challenge typically involve loading a second view that prompts a user to confirm that the user actually user wanted to input the command. However, these second views are inefficient, requiring the computing device to load a second view and requiring the user to repeat an input. Systems and methods providing improved graphical user interfaces for efficiently minimizing accidental user inputs are needed to improve the functionality of personal computing devices.

SUMMARY

One implementation of the present disclosure is a method. The method includes generating a graphical user interface. The graphical user interface includes a transferor account widget that identifies a transferor account. The transferor account widget is positioned proximate a first edge of the graphical user interface. The graphical user interface also includes a transferee account widget that identifies a transferee account. The transferee account widget is positioned proximate a second edge of the graphical user interface. The graphical user interface also includes a slider feature positioned between the transferor account widget and the transferee account widget. The slider feature has an origin and a goal. The method also includes detecting a slide of a user input member from the origin to the goal and, in response to detecting the slide of the user input member from the origin to the goal, initiating a transfer of funds from the transferor account to the transferee account.

Another implementation of the present disclosure is a method. The method includes aggregating information relating to a plurality of bills, providing a list of the plurality of bills on a graphical user interface, receiving a user selection of a selected bill of the plurality of bills, and generating a bill payment view of the graphical user interface for the selected bill based on information relating to the selected bill. The bill payment view includes a transferor account widget that identifies a transferor account and a biller field. The transferor account widget is positioned proximate a first edge of the graphical user interface and the biller field is positioned proximate a second edge of the graphical user interface. The graphical user interface also includes a slider feature positioned between the transferor account widget and the biller field. The slider feature has an origin and a goal. The method also includes detecting a slide of a user input member from the origin to the goal, and, in response to detecting the slide of the user input member from the origin to the goal, initiating payment of the selected bill with funds from the transferor account.

Another implementation of the present disclosure is a user device. The user device includes a touchscreen and an application circuit. The application circuit is structured to provide, on the touchscreen, a graphical user interface. The graphical user interface includes a transferor account widget that identifies the transferor account and a transferee account widget that identifies a transferee account. The transferor account widget is positioned proximate a first edge of the touchscreen and the transferee account widget is positioned proximate a second edge of the touchscreen. The graphical user interface also includes a slider feature positioned between the transferor account widget and the transferee account widget. The slider feature has an origin and a goal. The application circuit is also structured to detect a slide of a user input member on the touchscreen from the origin to the goal, and, in response to detecting the slide of the user input member from the origin to the goal, initiate a transfer of funds from the transferor account to the transferee account.

Another implementation of the present disclosure is a user device. The user device includes a touchscreen and an application circuit. The application circuit is structured to provide a list of a plurality of bills on a graphical user interface displayed on the touchscreen, receive a user selection via the touchscreen of a selected bill of the plurality of bills, and provide a bill payment view for the selected bill on the touchscreen. The bill payment view includes a transferor account widget that identifies a transferor account and a biller field. The transferor account widget is positioned proximate a first edge of the touchscreen and the biller field is positioned proximate a second edge of the graphical user interface. The bill payment view also includes a slider feature positioned between the transferor account widget and the biller field. The slider feature has an origin and a goal. The application circuit is also structured to detect a slide of a user input member on the touchscreen from the origin to the goal, and, in response to detecting the slide of the user input member from the origin to the goal, initiate payment of the selected bill with funds from the transferor account.

DETAILED DESCRIPTION

Referring to the Figures generally, the systems, methods, and apparatuses provided herein according to various embodiments relate to managing and enabling asset transfers using improved graphical user interfaces that are provided on touchscreens and, in particular, relatively small touchscreens such as those included with smartphones. Personal computing devices are improved by the systems and methods described herein through minimization of navigation steps and conservation of computing resources facilitated by unification of multiple types of funds transfers (e.g., between one user's accounts, from a user to a bill issuer, between two users) within a single application, with a consistent graphical user interface, and by presenting relevant account information on a touchscreen of the display device simultaneously with an amount to be transferred and a slider feature to input a command to make the transfer. Additionally, the systems and methods described herein efficiently mitigate the risk of accidental or inadvertent user input triggering a money transfer by providing a slider feature that is intuitive and easy to use yet unlikely to be accidentally engaged to trigger the transfer of money. These systems and methods and their advantages over conventional personal computing devices are described in detail below.

Figure 1:
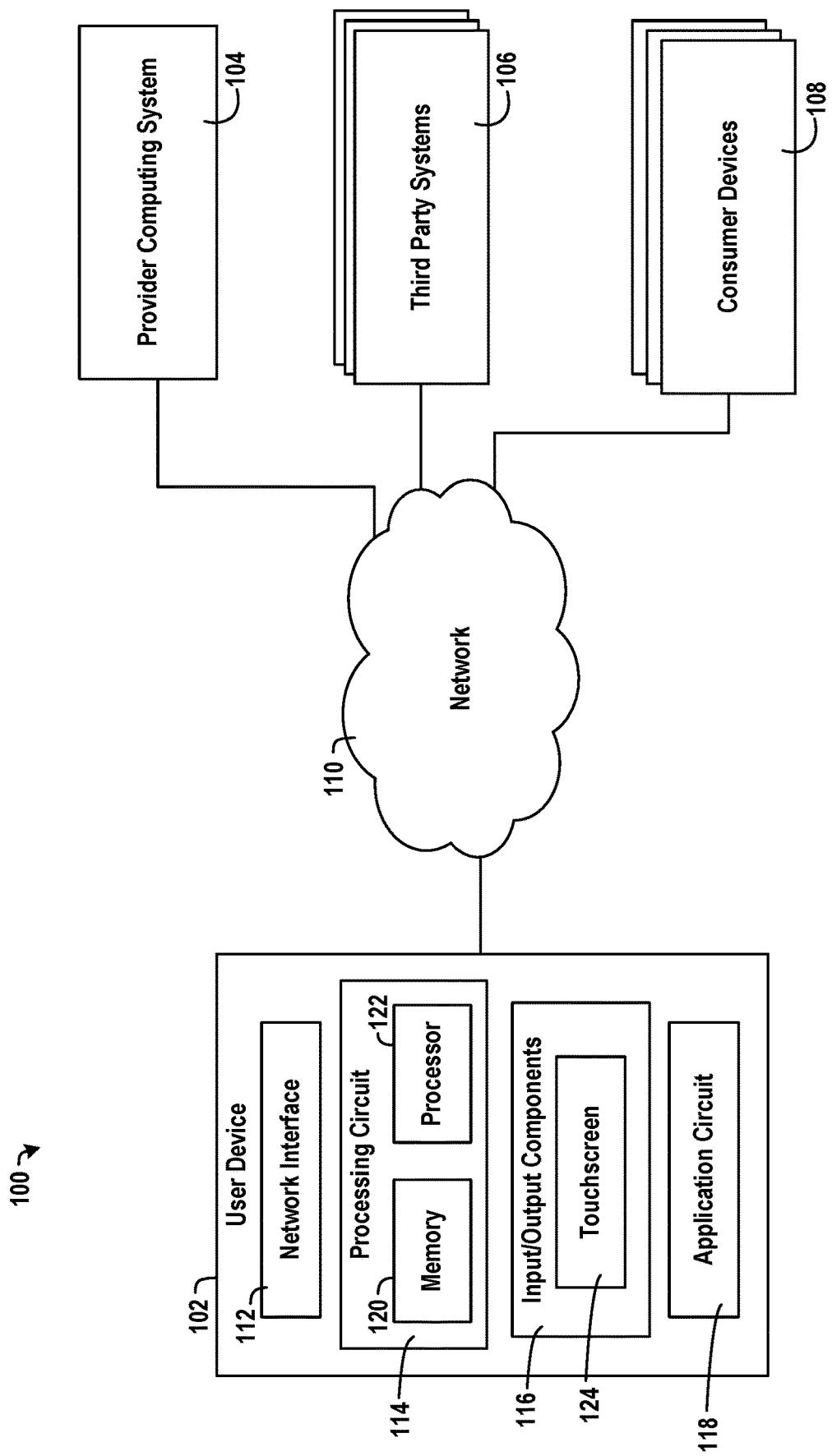
FIG. 1 is a block diagram of a system for providing improved graphical user interfaces on a user device, according to an example embodiment.

Referring to FIG. 1, a system 100 for facilitating asset transactions, such as monetary transactions, based on an input from a user via a computing device, such as a personal computing device with a small touchscreen, is shown according to an example embodiment. System 100 includes a user device 102 communicably coupled via a network 110 to a provider computing system 104, third party systems 106, and consumer devices 108.

The user device 102 is structured to provide a user with the graphical user interfaces and functions described herein. More particularly, the user device 102 is configured to provide graphical user interfaces that are capable of receiving a user input, and communicate with the provider computing system 104 to allow the user to transfer money between the user's bank accounts, pay bills, and request payments and receive requests for payments from other people in an efficient and intuitive manner. As shown, the user device 102 includes a network interface 112, a processing circuit 114, input/output components 116, and an application circuit 118.

The network interface 112 facilitates connection of the user device 102 to the network 110. Accordingly, the network interface 112 supports communication via the network 110 between the user device 102 and the provider computing system 104, third party systems 106, and consumer devices 108. The network interface 112 may include a cellular modem, a Bluetooth transceiver, a Bluetooth beacon, a radio-frequency identification (RFID) transceiver, and/or a near-field communication (NFC) transmitter. In some embodiments, the network interface 112 includes cryptography capabilities to establish a secure or relatively secure communication session.

The processing circuit 114 is structured to control, at least partly, the user device 102 as described herein. The processing circuit includes memory 120 and processor 122. The processor 122 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 120 (e.g., RAM, ROM, NVRAM, Flash Memory, hard disk storage, etc.) may store data and/or computer code for facilitating at least some of the various processes described herein. In this regard, the memory 120 may store programming logic that, when executed by the processor 122, controls the operation of the user device 102.

The input/output components 116 are structured to exchange communication(s) with a user of the user device 102. The input/output components 116 receive user interface components for presentation to a user from the processing circuit 114 and/or the application circuit 118, and communicate user inputs to the processing circuit 114 and/or the application circuit 118.

The input/output components 116 include touchscreen 124. Touchscreen 124 is configured to display a graphical user interface and to allow a user to interact directly with what is displayed on the graphical user interface by touching corresponding areas of the touchscreen 124. More particularly, touchscreen 124 receives input from a user by detecting contact between the touchscreen 124 and a user interaction member (e.g., finger, stylus) in a particular location on the touchscreen. Accordingly, the touchscreen 124 is configured to detect and differentiate between taps, swipes, slides, etc. of a user interaction member on the touchscreen 124, including identifying coordinates on the touchscreen corresponding to the user interaction and to elements displayed in the graphical user interface. Additionally, the touchscreen 124 may be structured to differentiate between user touches of different pressures to provide an additional input dimension. In various embodiments, touchscreen 124 is a resistive touchscreen, a capacitive touchscreen, or other type of touchscreen. In addition to touchscreen 124, input/output components 116 may also include a speaker, microphone, vibration motor, fingerprint sensor, etc.

As used herein, "slide" ("slid", "sliding", "slides", etc.) refers to a movement of a user interaction member from a first point on the touchscreen 124 to a second point displaced from the first point on the touchscreen 124, with the user interaction member remaining substantially in contact with the touchscreen 124 throughout the movement. The term "slide" (slid, sliding, etc.) may also encompass a series of spatially contiguous yet temporally separated slides. For example, a continuous slide from a first point to a second point, followed by a disconnection between the user interaction member and the touchscreen, followed by a reconnection at the second point and a slide to a third point is referred to herein as a slide from the first point to the third point. However, it should be noted that some embodiments require a continuous (e.g., spatially and temporally unbroken) slide from an origin point to a goal point.

The application circuit 118 is configured to receive information from the provider computing system 104, generate user interfaces for presentation by the input/output components 116, receive input from a user via the input/output components 116, and transmit user inputs and commands to the provider computing system 104, as described in detail with reference to FIGS. 2-20. Accordingly, the application circuit 118 is communicably coupled to the provider computing system 104 via network interface 112 and network 110. In some embodiments, the application circuit 118 is a server-based application executable on the user device 102. In this regard, a user may have to first down load the application prior to usage. In another embodiment, the application circuit 130 is hard coded into the memory of the user device 102. In an alternative embodiment, the application circuit 130 is a web-based interface application. In this configuration, the user may have to log onto or access the web-based interface before usage of the application. The application circuit 118 may be at least partly supported by a separate computing system (e.g., provider computing system 104) comprising one or more servers, processors, network interface modules, etc. that transmit the application for use to the user device 102. In yet another alternative embodiment, the application circuit 118 includes its own set of dedicated or substantially dedicated hardware components and associated logic. The application circuit 118 may include an application programming interface (API) that facilitates integration with other applications, features, components, etc. of the user device 102. All such variations and combinations are intended to fall within the scope of the present disclosure.

As described in detail below, the application circuit 118 generates and provides a graphical user interface that includes a slider feature with an origin and a goal. According to various embodiments, the origin is a first predefined region, line, or point on the graphical user interface and the goal is a second predefined region, line, or point on the graphical user interface. An example in which the origin is a point corresponding to a first end of the slider feature and the goal is a point corresponding to a second end of the slider feature is shown in FIGS. 6-11 and FIGS. 15-17 and described in detail with reference thereto. Based on input data from the touchscreen, the application circuit 118 determines if a user interaction member touched the touchscreen 124 at a position corresponding to the origin of the slider feature and slid to a position corresponding to the goal, in some cases substantially along a preset path of the slider feature. In response to detecting that the user interaction member slid from the origin to the goal of the slider feature, the application circuit 118 generates a signal to transmit to the provider computing 104 that includes a request to transfer money from a first account to a second account. In some cases the first account and the second account are associated with the same entity (e.g., a user, a user's employer), while in other cases the first and second account are associated with different entities (e.g., a buyer and seller, a bill payer and a bill payee). Further details are described with reference to FIGS. 2-20.

The provider computing system 104 is associated with a provider entity that provides and maintains one or more financial accounts (e.g., demand deposit account, credit or debit card account, brokerage account, mortgage account, etc.) on behalf of the user. In some arrangements, the provider entity is an issuer of a payment vehicle held by the user. The payment vehicle may be used as a source payment vehicle for transactions engaged in via the user's mobile wallet. In the context of the present disclosure, the provider entity can include commercial or private banks, credit unions, investment brokerages, mobile wallet providers, and so on, but can also include any commercial entity capable of maintaining payment vehicles on behalf of a user, including retailers, vendors, service providers, and the like. In some arrangements, the provider entity is also a mobile wallet provider configured to manage mobile wallet accounts on behalf of its customers (i.e., users), including authenticating mobile wallet transactions involving debits from the users' payment vehicles.

In general, the provider computing system 104 is configured to provide data to the user device 102 for inclusion in user interfaces, to receive transaction requests from the user device 102, to execute the requested transactions, and to send confirmation signals to the user device 102. The data provided by the provider computing system 104 to the user device 102 includes a user's bank account balance(s) (e.g., a savings account balance and a checking account balance), credit card balances, bills (e.g., the identity of an entity that the user owes money to, an amount of money owed, and other details about the bill), requests for payment to or from other users, and/or any other information relating to a transaction that may be requested using the user device 102 as described herein. In some arrangements, the provider computing system 104 maintains financial accounts on behalf of the user (e.g., manages account balances, facilitates transfer of funds into and out of the accounts). The provider computing system 104 is communicably coupled to other computing systems, for example third party systems 106 and consumer devices 108, to locate and aggregate the relevant data. In the example shown, the provider computing system 104 is structured the same or substantially the same as the financial institution system 120 shown and described in U.S. Provisional Patent Application No. 62/611,288, filed Dec. 28, 2017 and incorporated by reference herein in its entirety. As such, the provider computing system 104 includes a series of application programming interfaces (APIs) configured to facilitate the exchange of communications between the provider computing system 104 and the third party systems 106.

Third party systems 106 refer to computer systems associated with third parties relative to the user. The user of user device 102 owes money to or is regularly billed for products/services by several third parties (e.g., a utility company, a cellphone service provider, a cable television provider, an internet provider, an insurance company, a landlord, a creditor). In one embodiment and in the example shown, the third party systems 106 include billing and collection systems of these third parties. Third party systems 106 are communicably coupled to the provider computing system 104 to facilitate the communication of bill information and account information to the user device 102, to execute requested money transfers, and to accept transfers and payments of money. For example, in some embodiments the provider computing system 104 includes multiple application programming interfaces (APIs) that facilitate data transfer between various third party systems 106 and the provider computing system 104. The APIs may use a user's credentials to access secure user-related data in the third party systems 106.

Each consumer device 108 corresponds to a person (other than the user of the user device 102) that uses the consumer device 108 to complete asset management tasks. Consumer devices 108 include smartphones, tablets, laptop computers, desktop computers, and/or other personal electronic devices. In some cases, one or more consumer devices 108 are substantially similar to user device 102. Consumer devices 108 communicate with the network 110, the provider computing system 104, and the user device 102 to allow for asset management including payments and payment requests between users of consumer devices 108 and a user of user device 102 (or other entities), as described in detail with reference to FIGS. 4 and 18-20.

Figure 2:
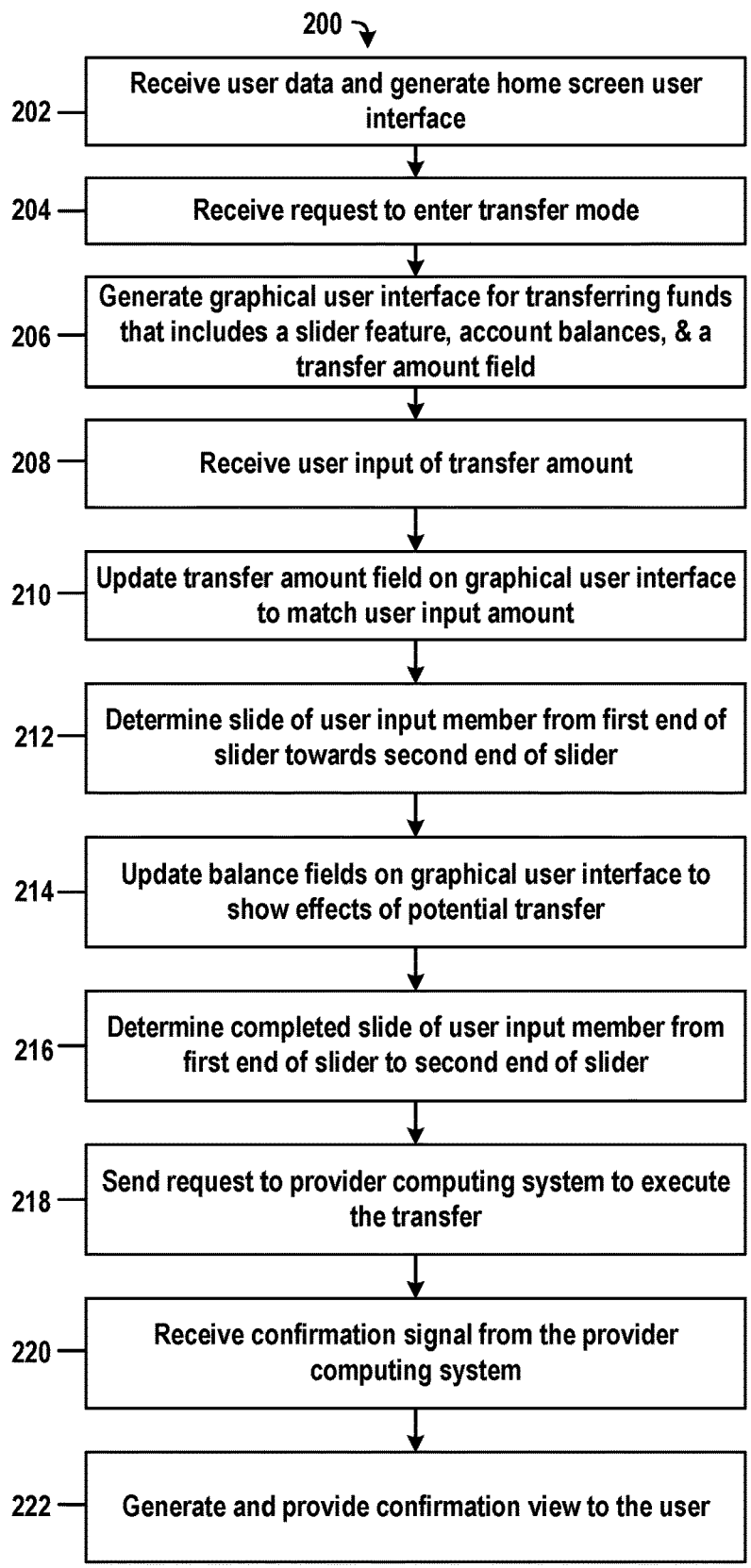
FIG. 2 is a flowchart of a process of providing a graphical user interface that allows a user to efficiently complete a transfer of assets between two accounts on a graphical user interface, according to an example embodiment.

Referring now to FIG. 2, a flowchart of a process 200 for providing a graphical user interface that allows a user to efficiently complete a transfer of money between two accounts on a small screen is shown, according to an example embodiment. Process 200 can be carried out by the user device 102 in communication with the provider computing system 104 of FIG. 1, and reference is made thereto in the following discussion for the sake of clarity.

At step 202, the user device 102 receives user data from the provider computing system 104 and generates a home screen graphical user interface for presentation on touchscreen 124. The user data includes information relating to the user's bank accounts (e.g., demand deposit accounts, investment accounts, loan accounts such as mortgages, etc.), bills (e.g., recurring monthly bills, etc.), payment requests, etc. that may be displayed by the user device 102 or otherwise used in process 200 as described below. Accordingly, the user data includes data relating to accounts managed by the provider computing system 104 as well as data aggregated by the provider computing system 104 from the third party systems 106 using a series of APIs as described above and in U.S. Provisional Patent Application No. 62/611,288, filed Dec. 28, 2017 and incorporated by reference herein in its entirety. For example, the provider computing system 104 and the APIs may use the user's credentials (login, username and password, etc.) to access secured information in third party systems 106. The user data, sourced from multiple third parties as well as from the provider entity, is accessible via the home screen in a single graphical user interface.

Figure 4:
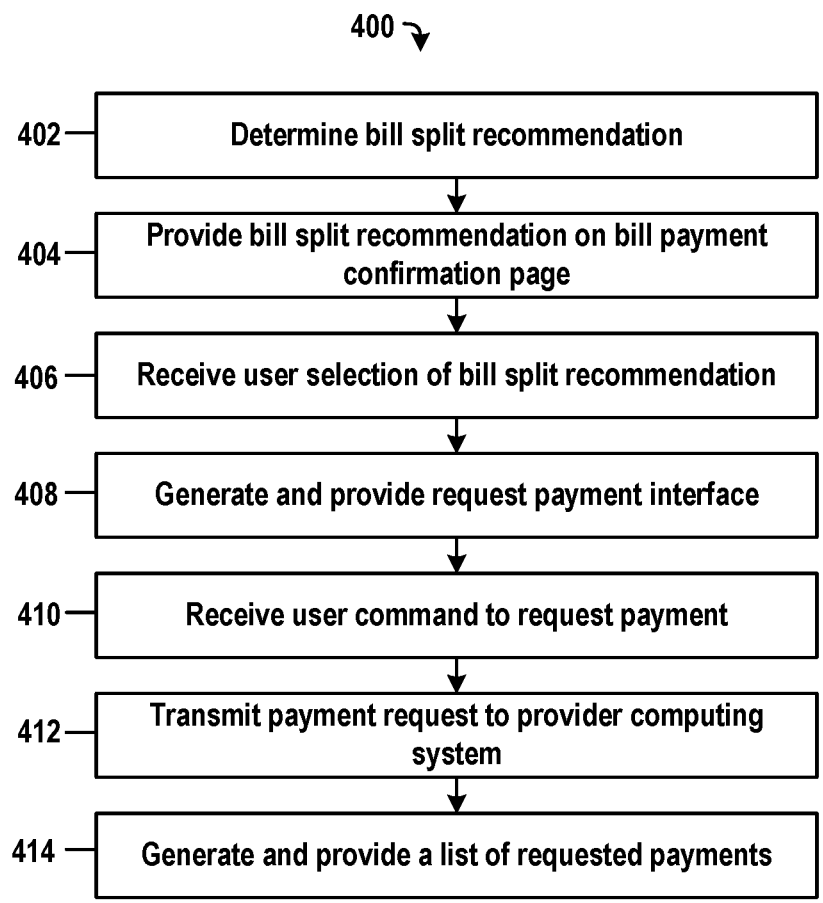
FIG. 4 is a flowchart of a process of facilitating the splitting of a bill between a user and another person, according to an example embodiment.
Figure 5:
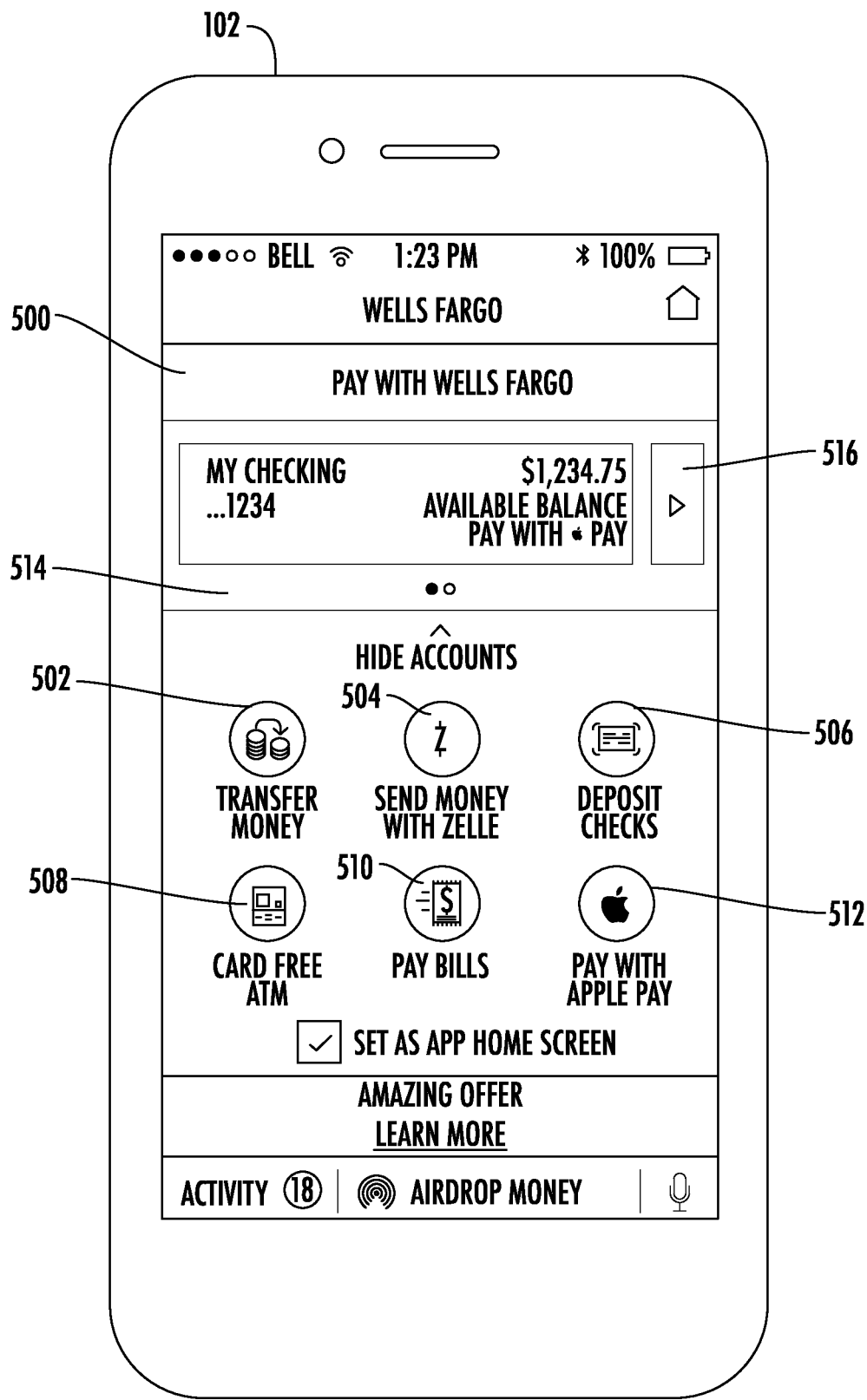
FIG. 5 is a first illustration of a home screen on the user device of FIG. 1, according to an example embodiment.

An example embodiment of a home screen is shown in FIG. 5. In general, the home screen includes an account information widget that displays user data relating to the user's bank accounts and icons corresponding to different functions that may be performed by the user device 102. Each icon can be selected to request to navigate to a corresponding mode, which refers to the functions provided by the mode (e.g., a bill pay mode refers to the function of enabling the user to pay his/her bills such as at various third parties like a utilities bill). In the example, the modes include a transfer mode, a pay-people mode, a bill pay mode, etc. within a unified application. In the transfer mode, the user can command the transfer of funds between two of the user's accounts, as described in detail below with reference to process 200. In the bill pay mode, the user can pay bills (i.e., request transfers of funds from the user's account(s) to an entity that the user owes money to), as described in detail with reference to FIG. 3. In the pay-people mode, the user can request payments from other people, receive payments from other people, and pay other people, as described in detail with reference to FIG. 4.

At step 204, the user device 102 receives a request from the user to enter a transfer mode, i.e., to navigate to a user interface view that allows the user to request to transfer money between the user's accounts. In an example case, a user notices in the account information widget of the home screen that the user's checking account balance is low and that the user's savings account has available funds, and decides to transfer funds from the user's savings account to the user's checking account. The user selects (e.g., touches, taps) an icon corresponding to a transfer mode to request to enter the transfer mode, and this request is received by the user device 102.

Figure 6:
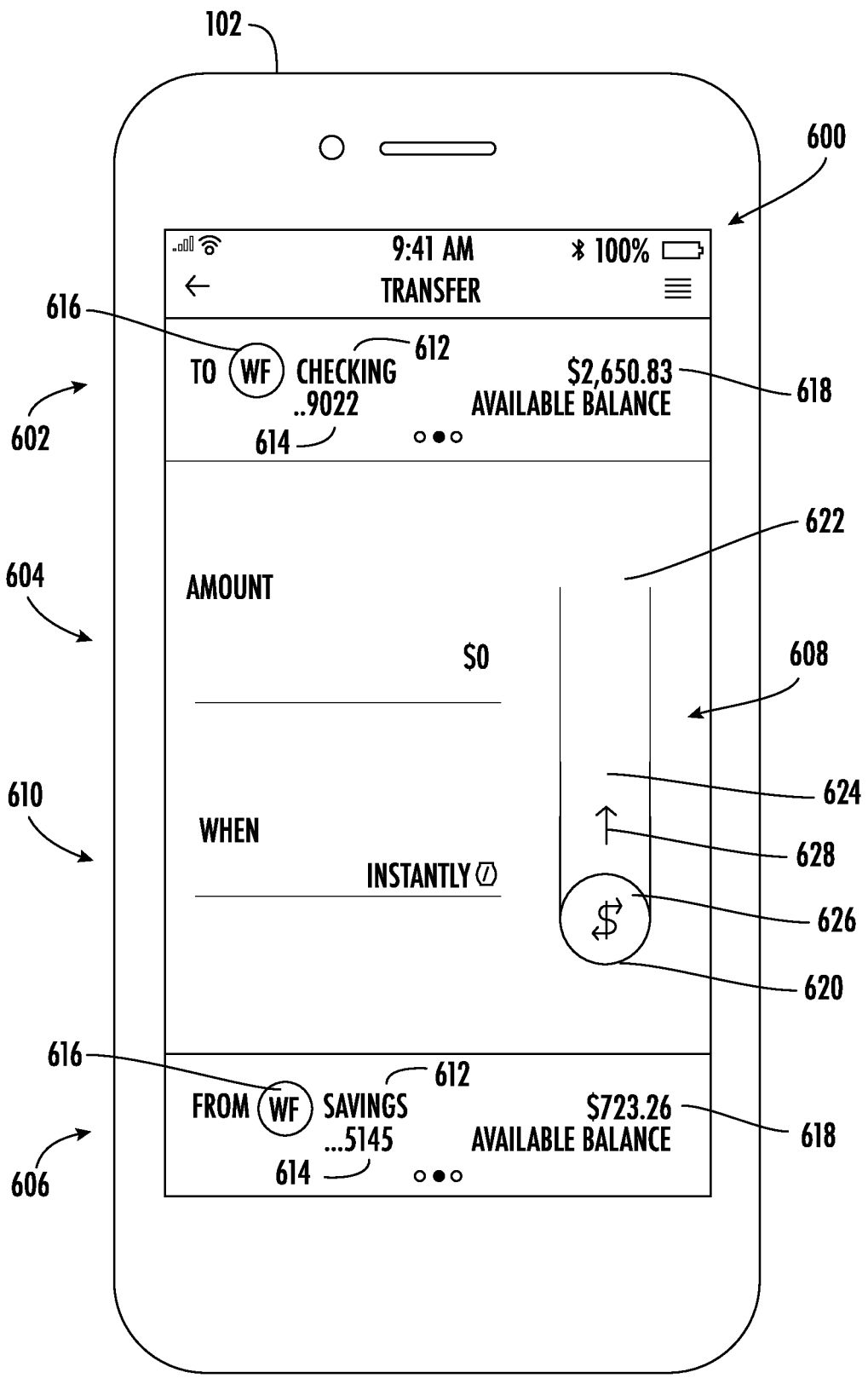
FIG. 6 is a first illustration in a series of a transfer mode graphical user interface on the user device of FIG. 1, according to an example embodiment.

At step 206, the user device 102 generates a graphical user interface configured to allow a user to request to transfer funds between the user's accounts that includes a slider feature, account balances, and a transfer amount field. Example embodiments of the transfer mode interface are shown in FIGS. 6-11 and described in detail with reference thereto. In general, the graphical user interface, preferably in a single view on the user device 102, provides an indication of an amount of money to be transferred between accounts, allows a user to select transferee and transferor accounts (i.e., a recipient account and a source account) while showing current account balances, and includes a slider feature that allows a user to command a transfer to be made. In general, the slider feature extends from an origin to a goal (e.g., from a first end to a second end), and may include a tab moveable by a user along a path from the origin to the goal. In the embodiments of FIG. 2-20, the origin corresponds to a first end of the slider feature and the goal corresponds to a second end of the slider feature. The slider feature is configured to accept a user command to execute a transfer from the transferor account to the transferee account, as described in detail below. As generated at step 206, the amount of money indicated for transfer may be zero dollars (e.g., as shown in FIG. 6) or may be an automatically-recommended amount of money to transfer.

Figure 7:
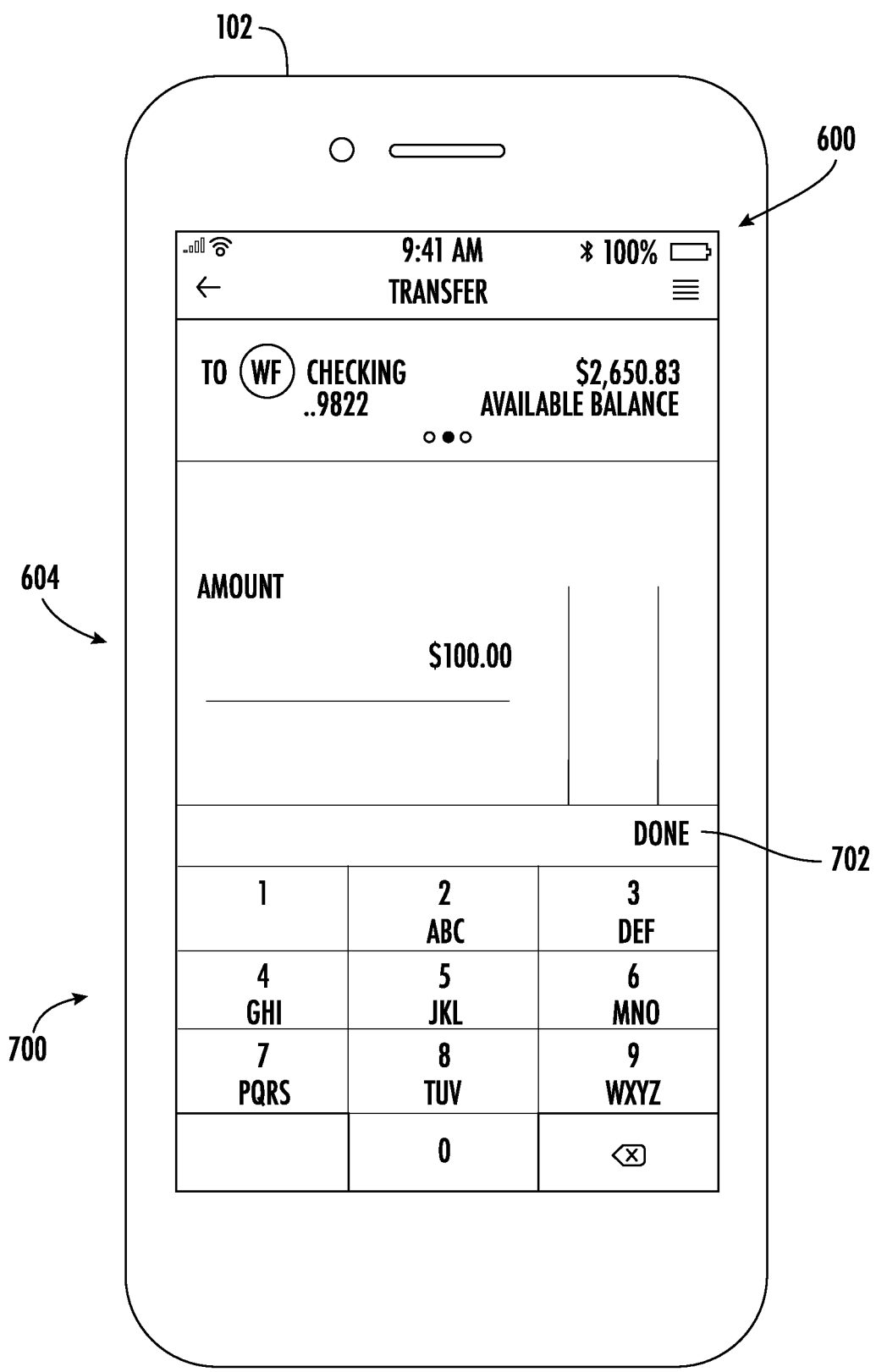
FIG. 7 is a second illustration in the series of a transfer mode graphical user interface on the user device of FIG. 1, according to an example embodiment.

At step 208, the user device 102 receives user input of a transfer amount. For example, the user device 102 may receive a user selection (e.g., touch, tap) of a transfer amount field on the graphical user interface and launch a number pad in response. An example of such a number pad is shown in FIG. 7 and described in detail with reference thereto below. The user device 102 then receives user input of a transfer amount as a number entered into the number pad by a user.

Figure 8:
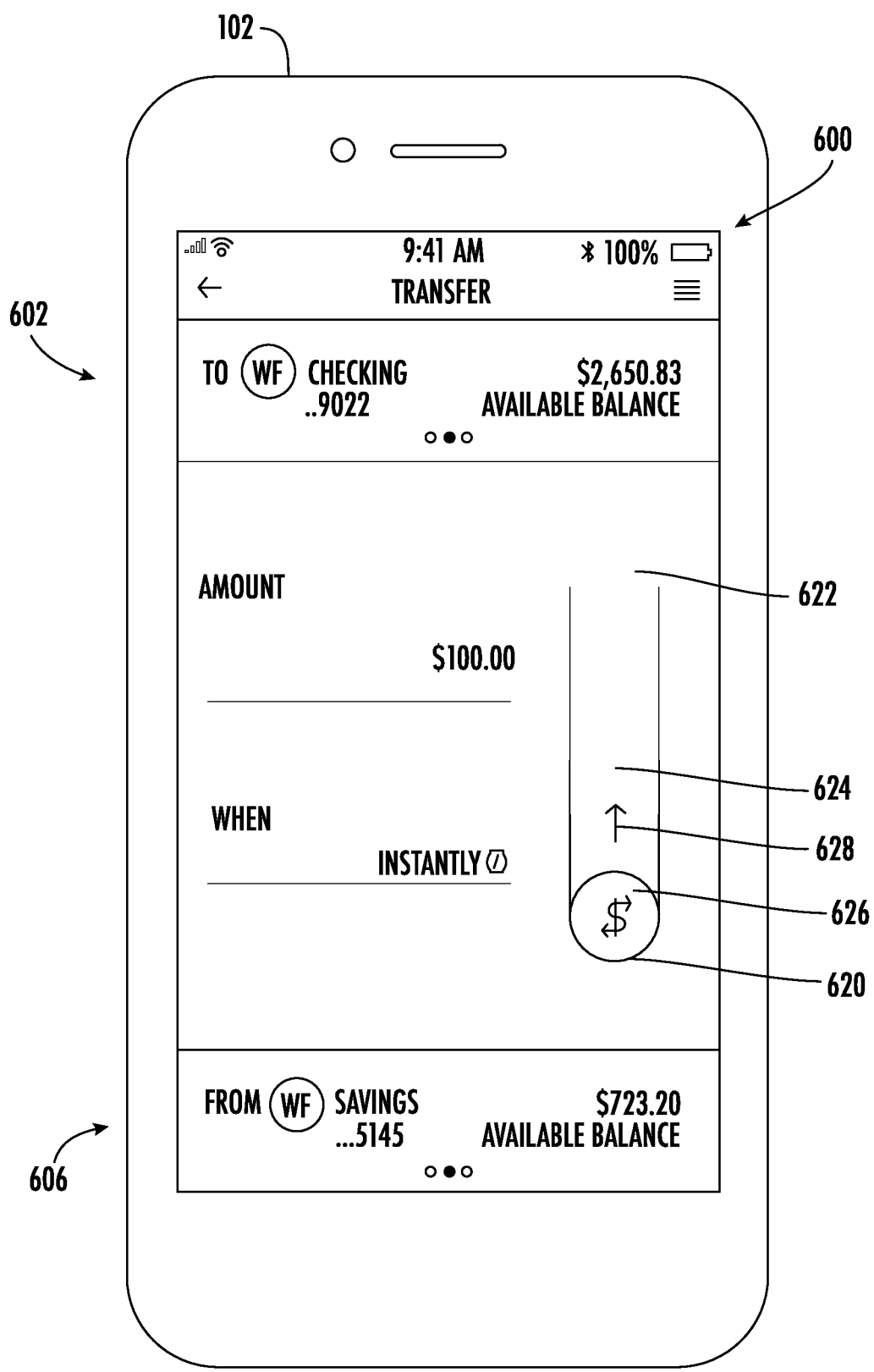
FIG. 8 is a third illustration in the series of a transfer mode graphical user interface on the user device of FIG. 1, according to an example embodiment.

At step 210, the transfer amount field on the graphical user interface is updated to indicate that the amount to be transferred is equal to the transfer amount received by the user device 102 from the user at step 208. An example of an updated graphical user interface is shown in FIG. 8 and described in detail with reference thereto below.

At step 212, the user device 102 detects a slide of a user input member (e.g., finger, stylus) from the first end of the slider feature towards the second end of the slider feature. In preferred embodiments, the first end and the second end are arranged on the graphical user interface such that a slide from the first end to the second end creates the impression for the user of sliding or pushing assets away from the user and towards a receiving entity. The first end of the slider feature has first coordinates on the touchscreen and the second end of the slider feature has second coordinates on the touch screen. At step 212, the user device 102 detects a touch of the touchscreen 124 by a user input member at the first coordinates followed by a slide to an intermediate position. The user device 102 determines whether the user input member slid from the first end towards the second end based on the coordinates of the intermediate position relative to the first coordinates and second coordinates (e.g., whether the distance between the intermediate position and the second coordinates is less than the distance between the first coordinates and the second coordinates).

Figure 9:
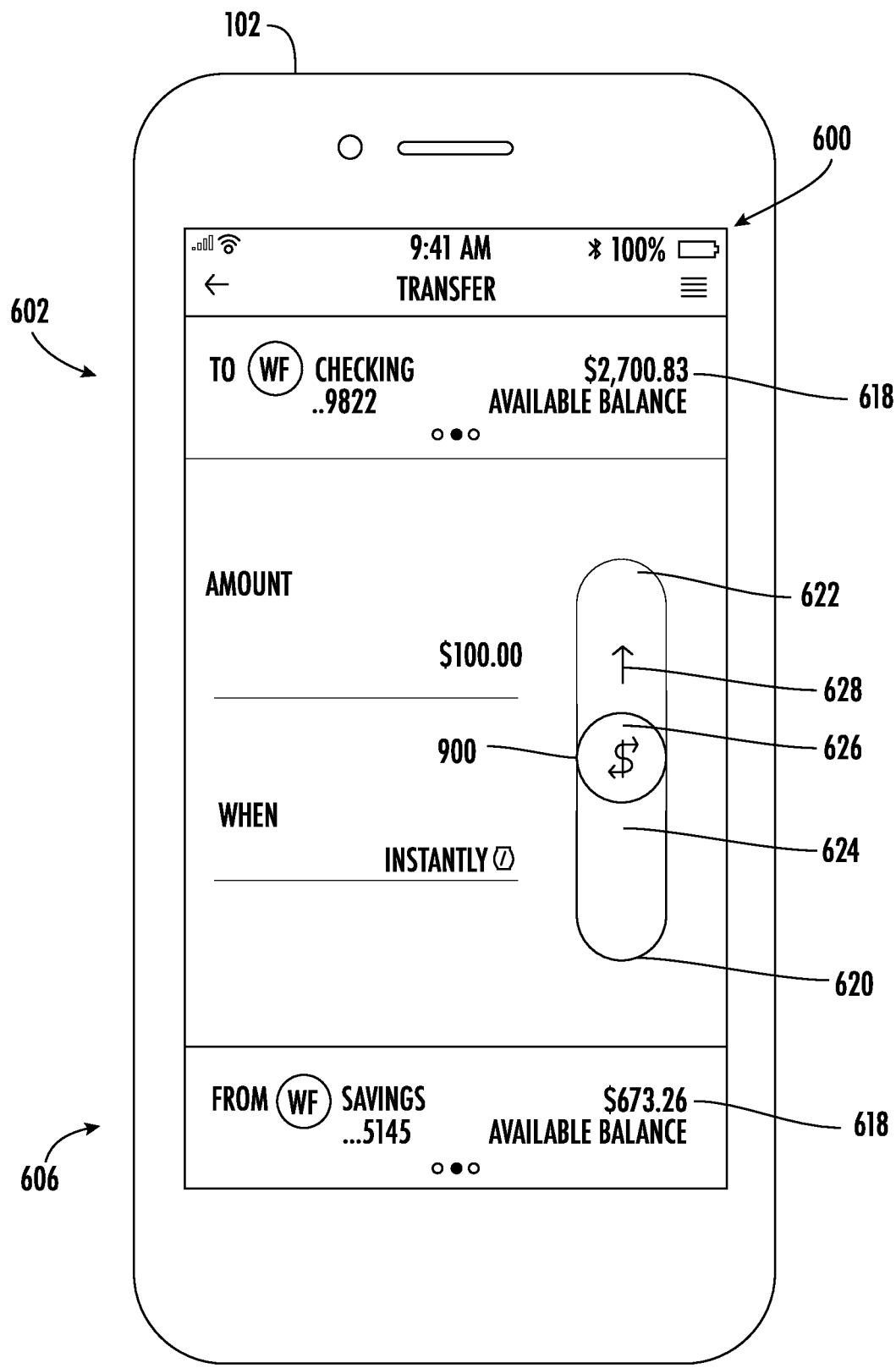
FIG. 9 is a fourth illustration in the series of a transfer mode graphical user interface on the user device of FIG. 1, according to an example embodiment.

In some embodiments, the slider feature includes a tab that tracks the slide along a slider path. The tab may be a circle, rectangle, or other shape, for example designed to create the impression that the tab represents money (e.g., coin-shaped, paper-money-shaped, shaped like or including a currency symbol). The graphical user interface is updated by the user device 102 to show the tab moving on the graphical user interface to follow the contact point between the user interaction member and the graphical user interface. In some embodiments, the tab is confined to travel along a preset path between the first and second ends, such that a slide from the first end towards the second end corresponds to a movement of the tab along a portion of the preset path. FIGS. 8-9 show such an example, and are described in detail below. The preset path may be a line between the first and second ends (e.g., a straight line, a curved line, a zig-zag line, or a line following any possible path between the first and second ends) or an allowable region containing or joining the first end and the second end. In some embodiments, the first end is at the same point as the second end, with the preset path forming a closed loop or loops (e.g., circle, square, figure-eight, other shape). In some embodiments, the preset path is user-defined. For example, in some cases a user-defined preset path is held secret by the user and can therefore be used as a security feature for verifying the user's identity.

At step 214, in response to a determination that a user input member slid from the first end towards the second end, account balances shown on the user interface are updated to show the effects of the transfer. In some embodiments, the account balances are dynamically updated to show the transfer amount switching accounts proportionally to the progress of the user input member from the first end to the second end (e.g., when the user input member has slid halfway from the first end to second end, half the transfer amount is shown as having switched accounts). FIG. 9 shows an example of such embodiments, as is described in detail with reference thereto below. In other embodiments, the user interface is updated to show changes in the account balances that would occur as a result of the potential transfer if executed. That is, in such embodiments, the transfer amount indicated in the transfer amount field on the graphical user interface is subtracted from an account balance displayed for the transferor account and added to an account balance displayed for a transferee account. The effects of a transfer are thereby displayed to a user before a final command to initiate the transfer is received from the user.

At step 216, the user device 102 determines the completion of a slide of a user input member (e.g., finger, stylus) from the first end of the slider feature to the second end of the slider feature. For example, the user device 102 detects a touch of the touchscreen 124 by the user input member at the first coordinates followed by a slide to the second coordinates. In some embodiments, determining the completion of a slide requires detecting a continuous slide (i.e., spatially and temporally unbroken) from the first end to the second end. In some embodiments, a determination of the completion of the slide requires a determination that the user input member substantially followed a preset path between the first end and the second end. For example, in an embodiment where the preset path is a loop with the first coordinates identical to or proximate the second coordinates (i.e., the first and second ends are in the same location), a determination of the completion of a slide requires detection of contact between the user input member and the touchscreen 124 at a sequence of coordinates that define the preset path. The path may be represented on the graphical user interface.

Figure 10:
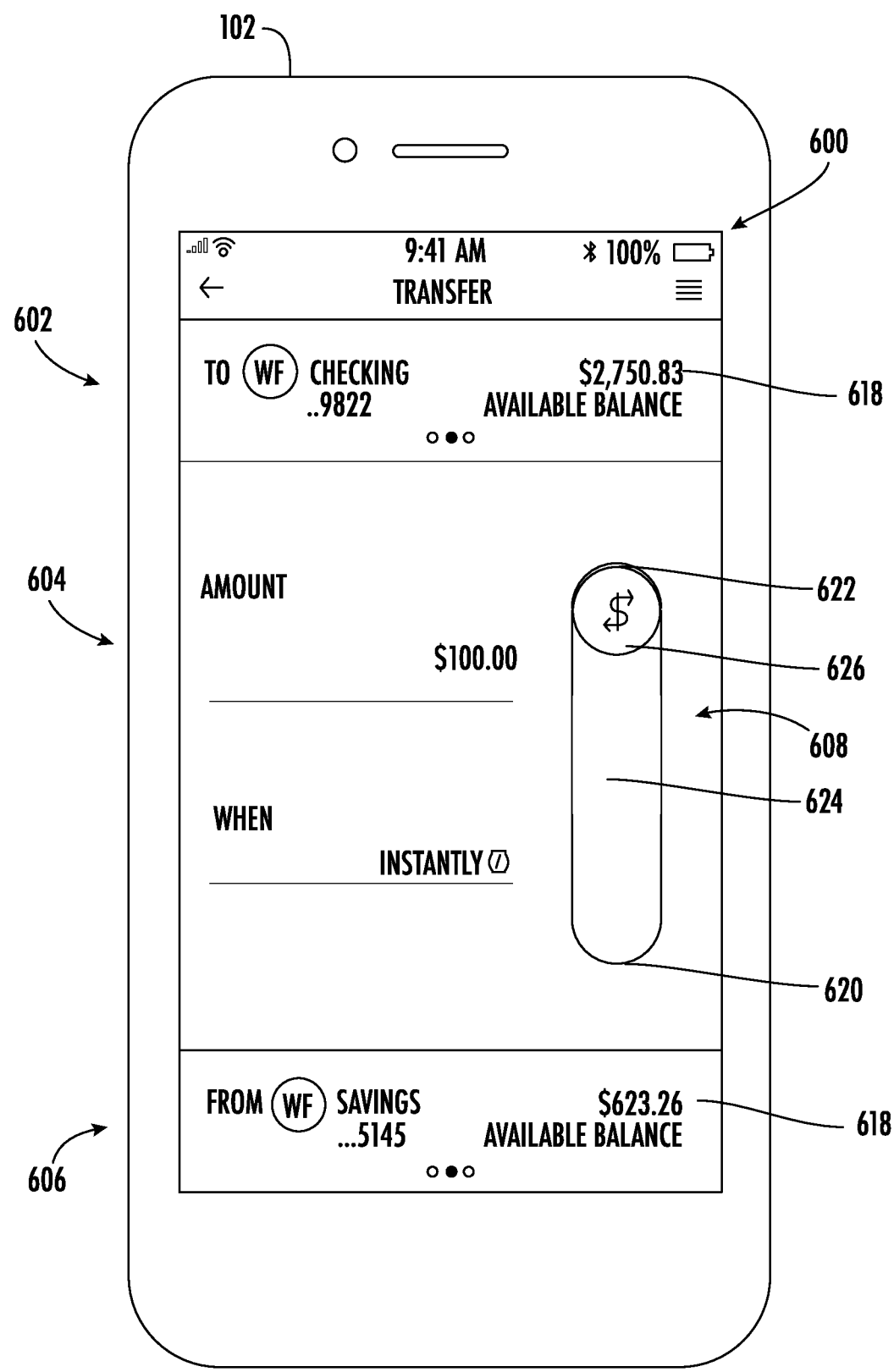
FIG. 10 is a fifth illustration in the series of a transfer mode graphical user interface on the user device of FIG. 1, according to an example embodiment.

In some embodiments, a tab is included with the slider feature that can be repositioned by a user along the preset path using any combination of slides. In some cases, the tab remains in the position where a user input member breaks contact with the touchscreen 124, or, in some cases, with the path, until the user input member reestablishes contact with the touchscreen 124 at the position of the tab and slides the tab to a new position along the path. In some cases, the tab drifts back towards the first end or snaps back to the first end when the user input member breaks contact with the touchscreen 124, until the user input member reestablishes contact with the touchscreen 124 at the current position of the tab and slides the tab to a new position along the path. The slide is "complete" when the tab reaches the second end, for example as shown in FIG. 10. It should be noted that the phrase "slide from the first end to the second end", as used herein, generally encompasses all such scenarios.

At step 218, in response to a determination that a user input member completed a slide from the first end to the second end, the user device 102 sends a request to the provider computing system 104 to execute the transfer. The request includes the transfer amount, an identification of the transferee account, and an identification of the transferor account. At step 220, the user device 102 receives a confirmation signal from the provider computing system. The confirmation signal indicates that the provider computing system has received the transfer request and that the transfer has been or will be completed as requested.

Figure 11:
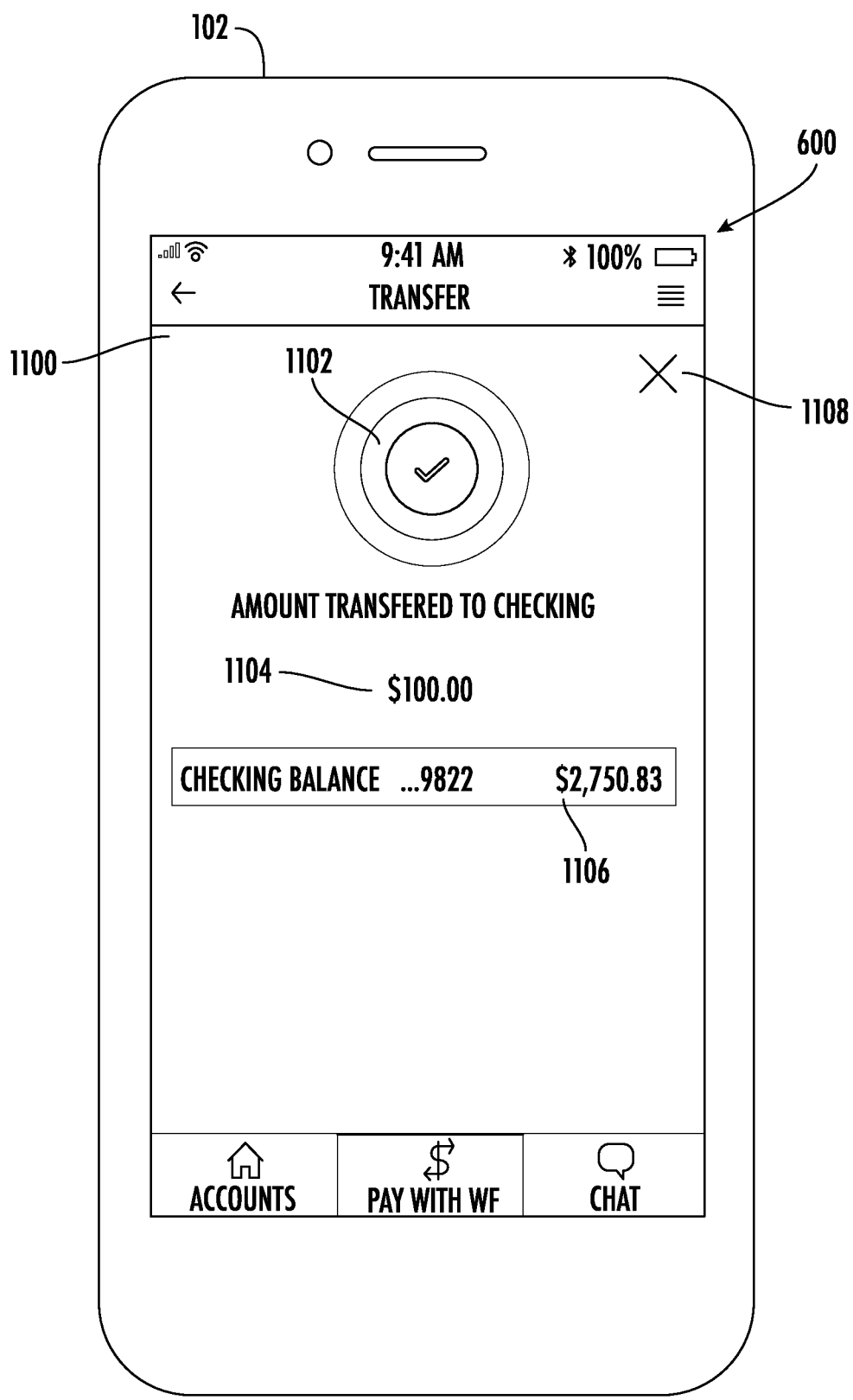
FIG. 11 is a sixth illustration in the series of a transfer mode graphical user interface on the user device of FIG. 1, according to an example embodiment.

At step 222, in response to the confirmation signal, the user device 102 generates and provides a confirmation view to the user in the graphical user interface. The confirmation view assures the user that the user's transfer request has been received and has been or will be completed. An example of a confirmation view is shown in FIG. 11.

Figure 3:
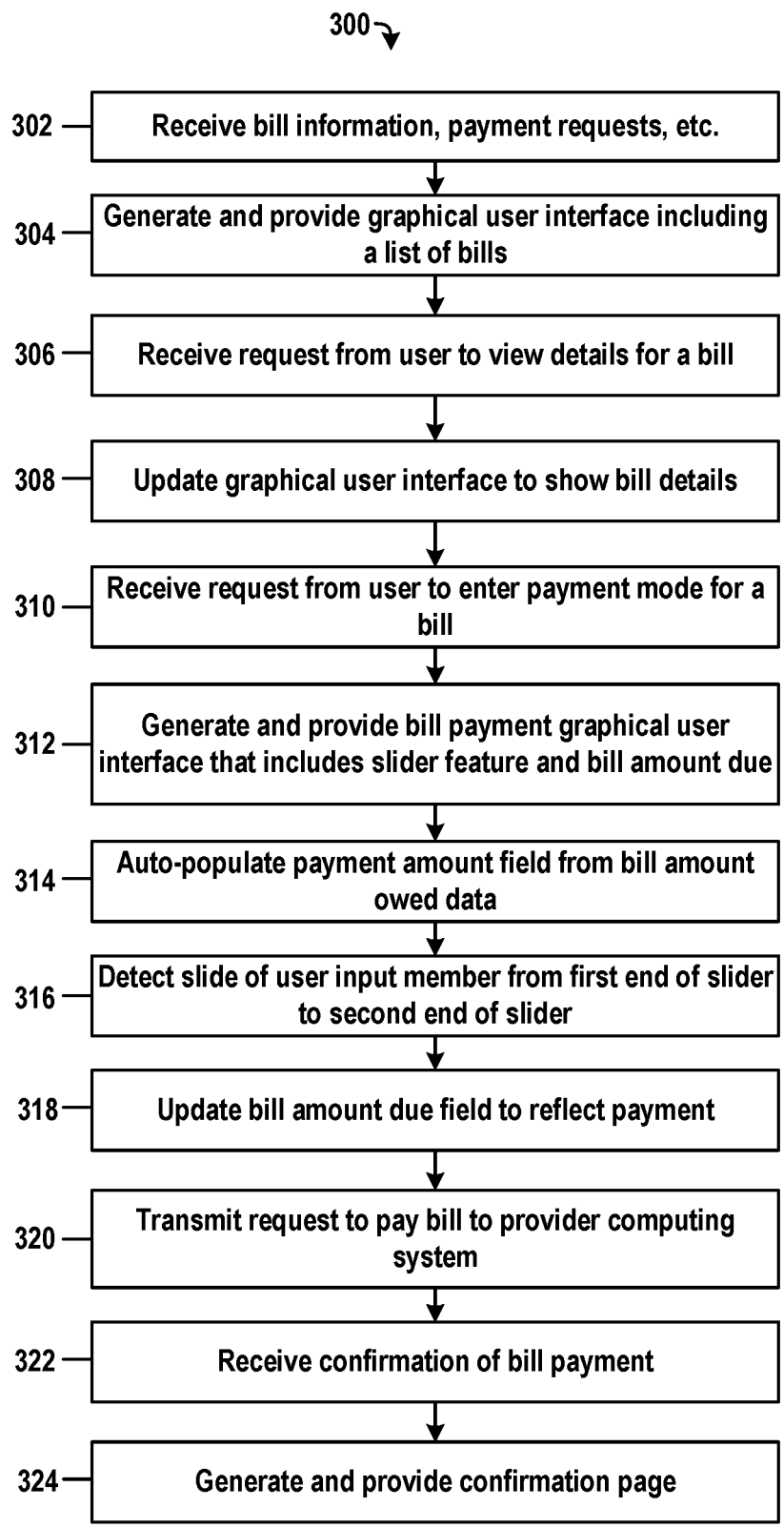
FIG. 3 is a flowchart of a process of facilitating bill payment by a user associated with the user device 102 of FIG. 1, according to an example embodiment.

Referring now to FIG. 3, a process 300 for facilitating bill payment by a user of the user device 102 is shown, according to an example embodiment. Process 300 can be carried out by the user device 102 in communication with the provider computing system 104 of FIG. 1, and reference is made thereto in the following description of process 300 for the sake of clarity.

At step 302, the user device 102 receives bill information from the provider computing system 104. The bill information includes information relating to money requested (e.g., in a bill, invoice, payment request) by third parties (e.g., utility companies, landlords, roommates, friends). In various embodiments, bill information includes an identity of the biller (i.e., the entity asking to be paid, the recipient of the payment), the reason for the charge (e.g., the type of service provided, the quantity of a product sold, services utilized in a past predefined time period, such as one month), a payment history, payment due date, and/or other relevant information. The bill information is aggregated by the provider computing system from third party systems 106, consumer devices 108, and/or user device 102.

Figure 13:
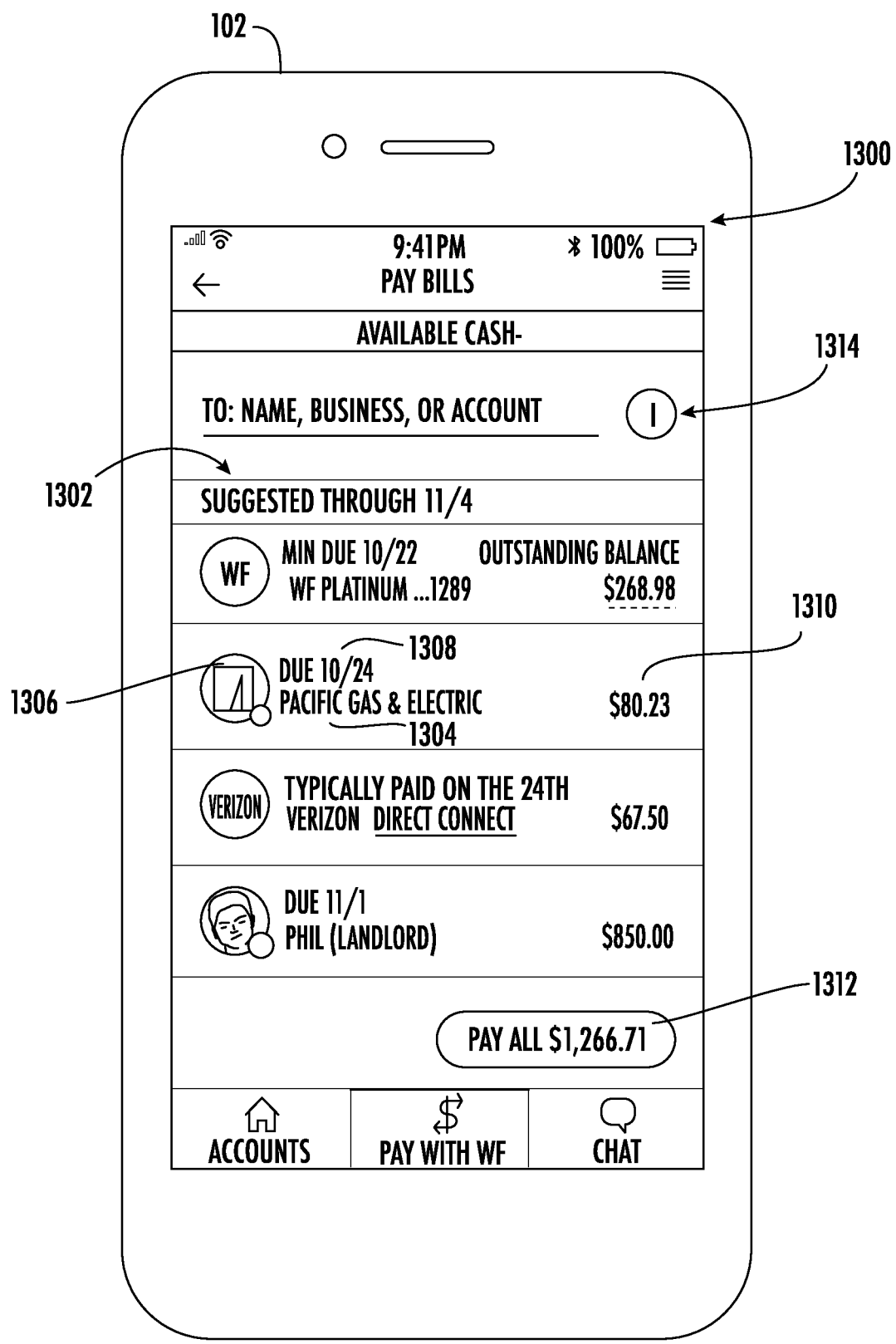
FIG. 13 is a first illustration in a series of a bill pay graphical user interface on the user device of FIG. 1, according to an example embodiment.

At step 304, the user device 102 generates and presents a graphical user interface that includes a list of bills. The list of bills includes an entry for each bill (e.g., bill, invoice, payment request) for which the user device 102 received bill information at step 302. In various embodiments, each entry includes an identification of the biller, a biller logo, a due date, an outstanding balance, a minimum requested payment, and/or an identification of the reason for the charge (e.g., an credit card number for a credit card balance owed). In some embodiments, the graphical user interface also includes a pay all button that launches an interface allows a user to simultaneously command payment of all bills on the list of bills. An example is shown at FIG. 13 and described in detail below with reference thereto.

At step 306, the user device 102 receives a request from the user to view details for a bill on the list of bills. In an embodiment, where the touchscreen 124 is configured to differentiate between pressures applied to the touchscreen 124 by user input members, the user can request to view details for a bill by pressing strongly (as opposed to tapping lightly) on the entry for that bill on the list of bills. A light tap may correspond to a request to enter a payment mode for that bill, as described below with reference to step 310. Other user inputs may also correspond to a request to view details for a bill, for example a long hold of a user input member at the position of an entry for the bill on the touchscreen.

Figure 14:
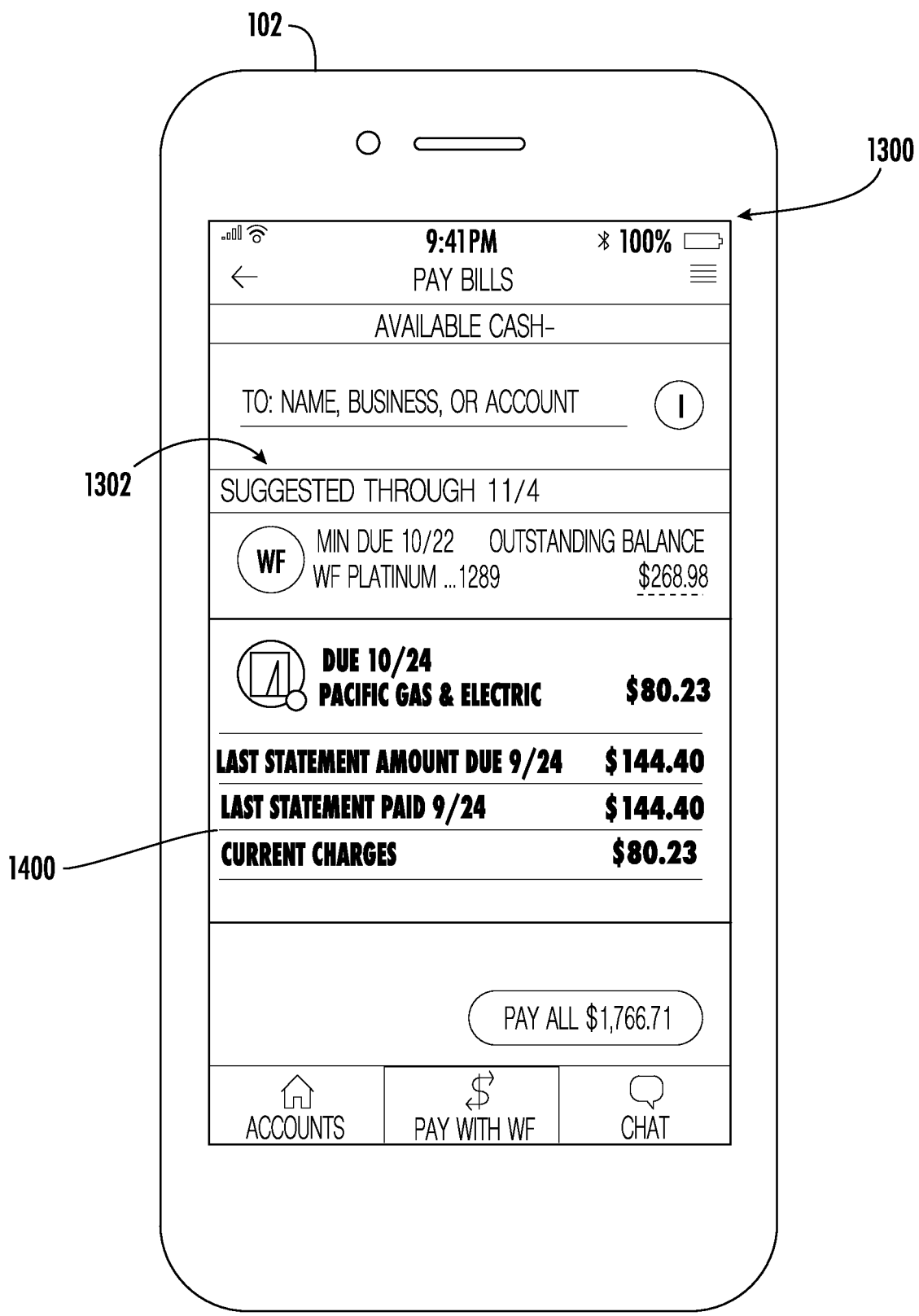
FIG. 14 is a second illustration in the series of a bill pay graphical user interface on the user device of FIG. 1, according to an example embodiment.

At step 308, the user device 102 updates the graphical user interface to show bill details. Bill details may be shown on a pop-up window that partially obscures the list of bills, for example as shown in FIG. 14 and described in detail with reference thereto. Bill details include any or all of the bill information for that bill received by the user device 102 at step 302, for example a payment history, a summary of reasons for the charges, a due date, and an amount owed. The graphical interface returns to the full view of the list of bills as generated at step 304 when requested by a user, for example when the user releases the user input member from pressing against the touchscreen 124.

At step 310, the user device 102 receives a request from the user to enter a payment mode for a bill. For example, a tap of a user input member on an entry on the list of bills may be received as a request to enter a payment mode for that bill. As mentioned above, the graphical user interface may include a pay all bills button that can be selected by the user to enter a payment mode to pay all bills at once (e.g., with a single slide of a slider feature as described below).

At step 312, a graphical user interface for a payment mode that allows a user to input a command to pay the bill is generated and provided to the user by the user device 102. The graphical user interface includes an indication of the amount owed (i.e., the amount requested by the biller), a payment amount field (i.e., that shows the amount of money that a payment as requested at step 320 below would be made for), user account information for an account of the user from which money would be taken to pay the amount shown in the payment amount field, and a slider feature configured to allow the user to request a payment be made. The slider feature has a first end and a second end. The user account information may be presented in a widget that allows a user to select between multiple accounts to choose which account a bill payment is made from. The graphical user interface generated at step 312 is configured to present information and accept input in a substantially similar arrangement as the graphical user interface generated at step 206 in process 200 shown in FIG. 2.

Figure 15:
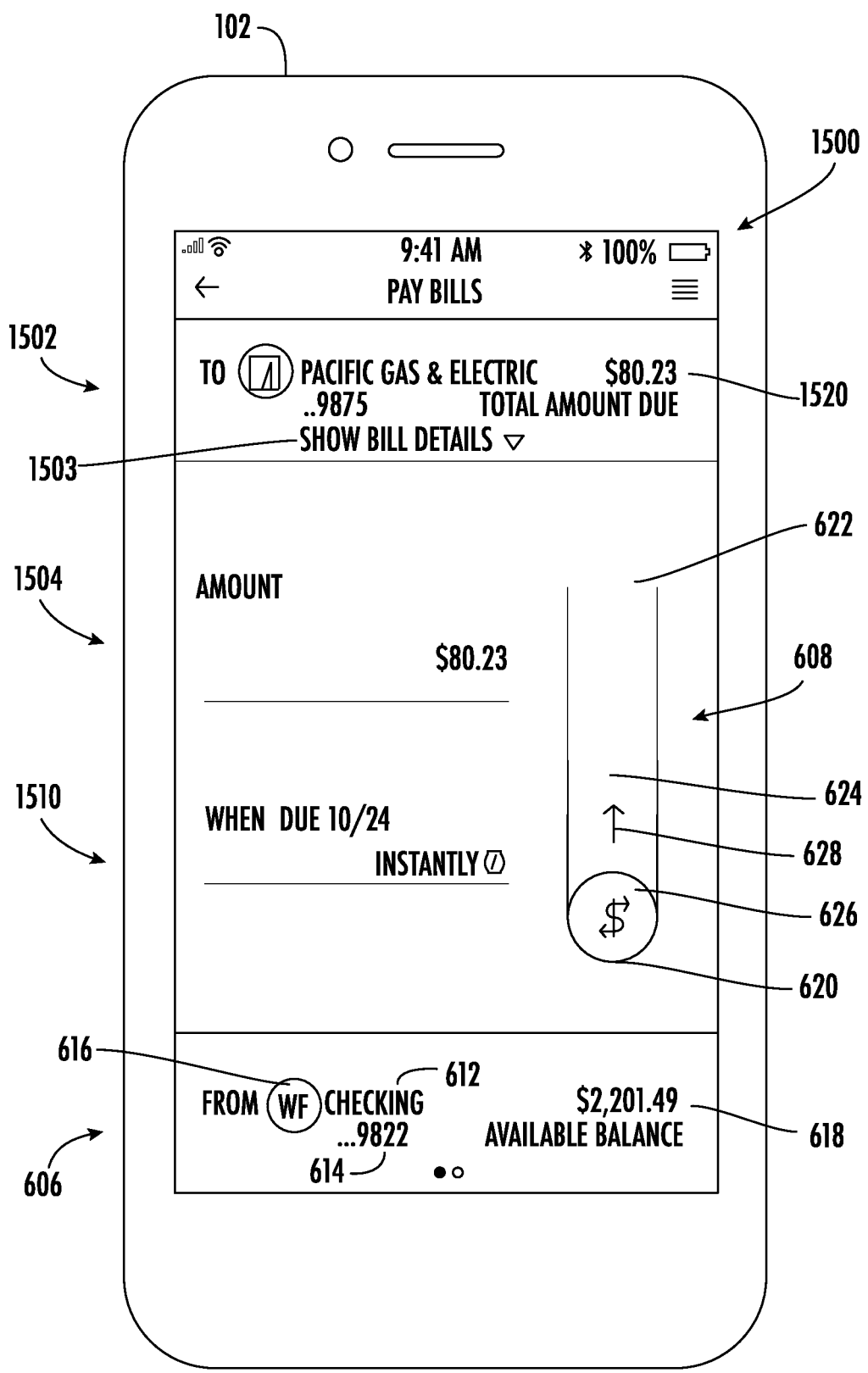
FIG. 15 is a third illustration in the series of a bill pay graphical user interface on the user device of FIG. 1, according to an example embodiment.

At step 314, the payment amount field is auto-populated with the amount owed for the bill based on the bill information received by the user device 102 from the provider computing system 104 at step 302. The user therefore need not enter the amount due on the bill before a payment of the bill in full is made. In some embodiments, the user can edit the payment amount field if the user desires to pay more or less than the total amount requested by the biller. An example graphical user interface corresponding to steps 312 and 314 is shown in FIG. 15 and described in detail with reference thereto.

At step 316, the user device 102 determines the completion of a slide of a user input member (e.g., finger, stylus) from the first end of the slider feature to the second end of the slider feature. The user device 102 detects a touch of the touchscreen 124 by the user input member at first coordinates corresponding to the first end followed by a slide to the second coordinates corresponding to the second end. In some embodiments, determining the completion of a slide requires detecting a continuous slide (i.e., spatially and temporally unbroken) from the first end to the second end. In some embodiments, a determination of the completion of the slide requires a determination that the user input member substantially followed a preset path between the first end and the second end. The path may be represented on the graphical user interface.

Figure 17:
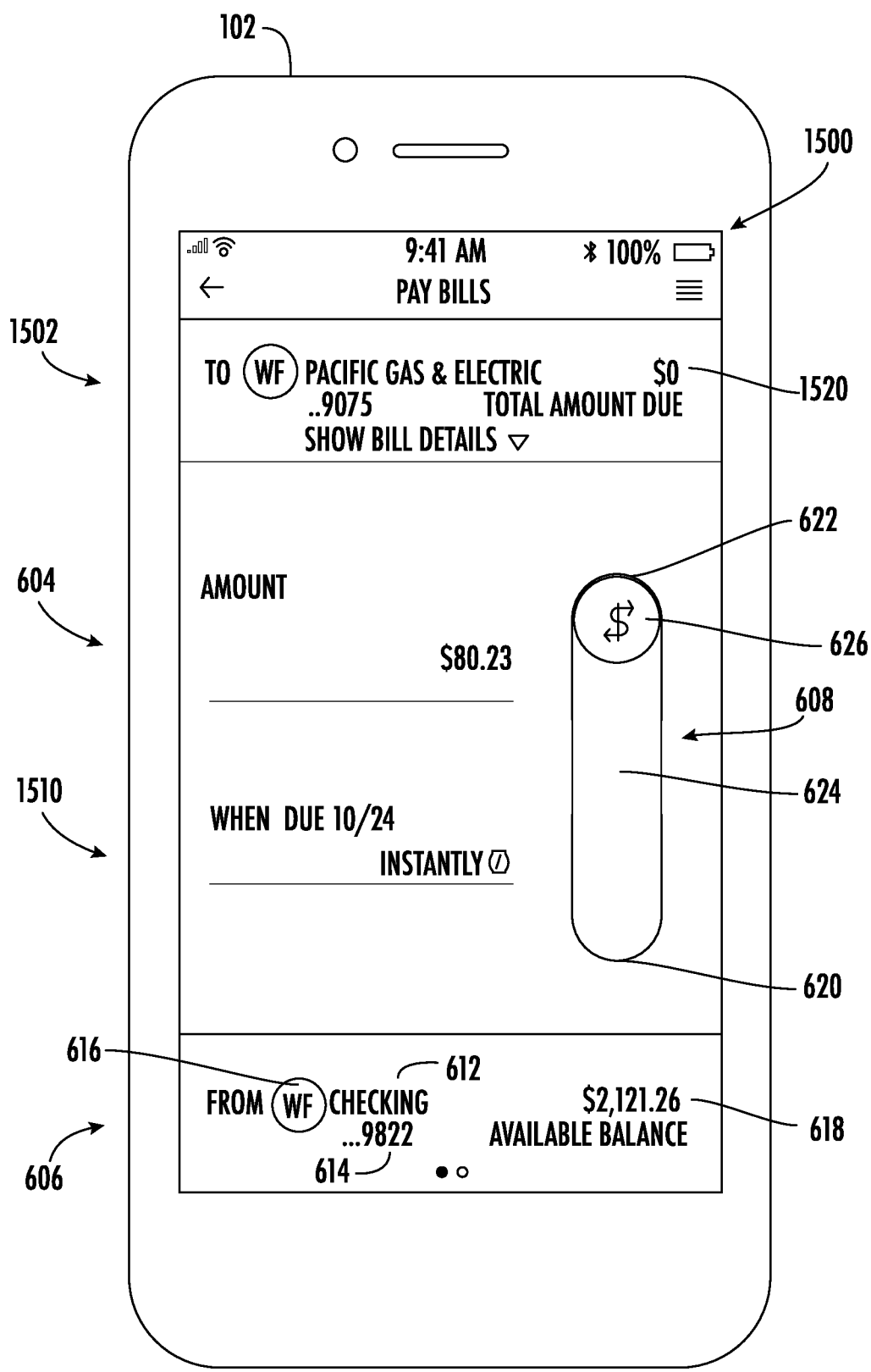
FIG. 17 is a fifth illustration in the series of a bill pay graphical user interface on the user device of FIG. 1, according to an example embodiment.

In some embodiments, a tab is included with the slider feature that can be repositioned by a user along the preset path using any combination of slides. In some cases, the tab remains in the position where a user input member breaks contact with the touchscreen 124, or, in some cases, with the path, until the user input member reestablishes contact with the touchscreen 124 at the position of the tab and slides the tab to a new position along the path. In other cases, the tab drifts back towards the first end or snaps back to the first end when the user input member breaks contact with the touchscreen 124, until the user input member reestablishes contact with the touchscreen 124 at the current position of the tab and slides the tab to a new position along the path. The slide is "complete" when the tab reaches the second end, for example as shown in FIG. 17. It should be noted that the phrase "slide from the first end to the second end", as used herein, encompasses all such scenarios.

Figure 16:
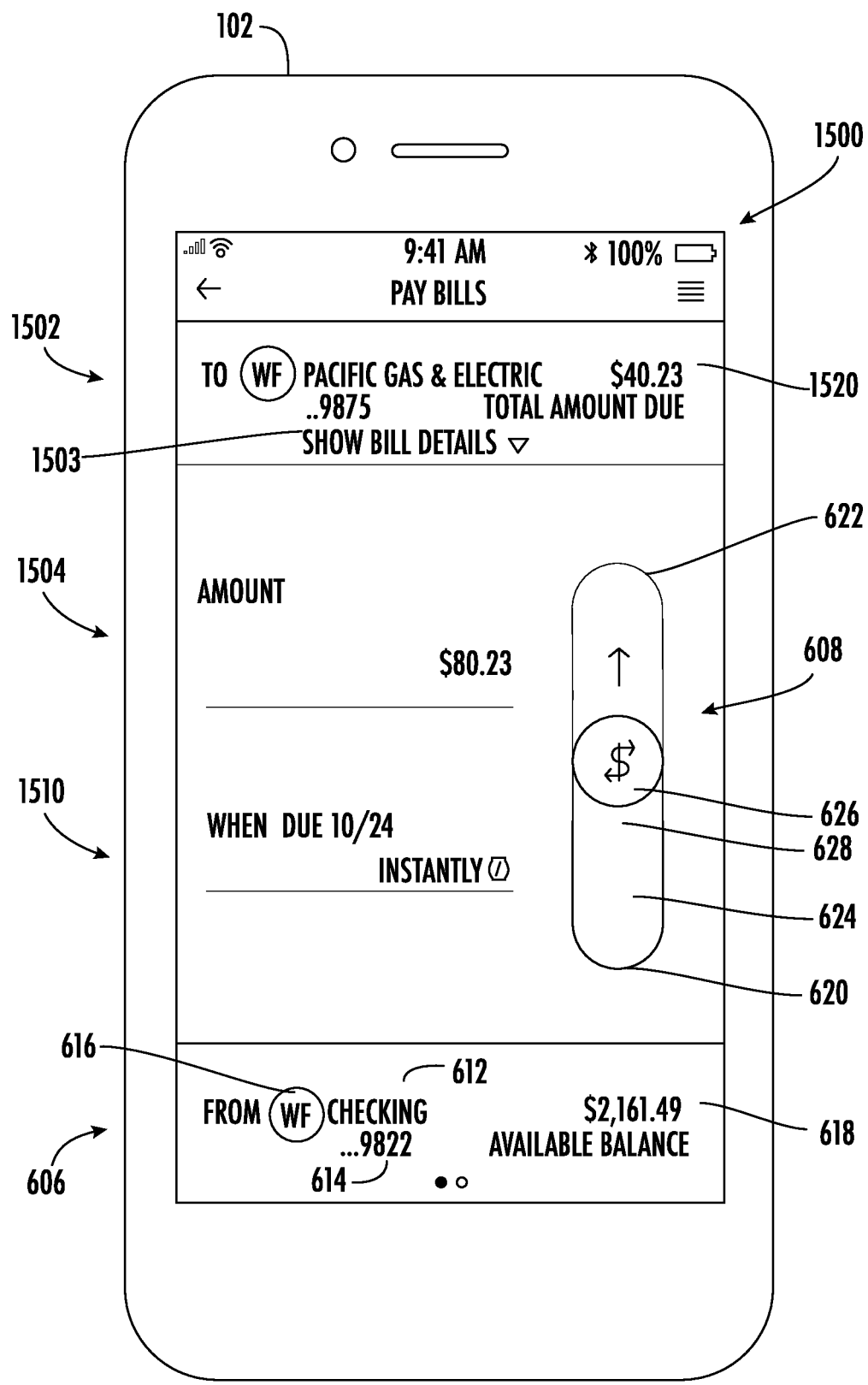
FIG. 16 is a fourth illustration in the series of a bill pay graphical user interface on the user device of FIG. 1, according to an example embodiment.

At step 318, the user device 102 updates the bill amount owed displayed on the graphical user interface to reflect the payment. In some embodiments, for example as shown in FIG. 16 and described in detail below with reference thereto, as the user input member slides along a portion of the path from the first end to the second end, a proportional amount of the payment amount is subtracted from the bill amount due as displayed on the graphical user interface. For example, when the user input member has slide half-way from the first end to the second end, the bill amount owed has been reduced by half of the payment amount. Thus, once the user input member reaches the second end, the entire payment amount has been removed from the bill amount owed. In other embodiments, the entire payment amount is subtracted from the bill amount owed at once, for example when the user input member slides across a particular intermediate point or once the user input members slides to the second end. An account balance shown for the account the payment amount is coming out of may also be updated to show the effect of the payment. An example of a graphical user interface as updated at step 318 is shown in FIG. 17 and described in detail below with reference thereto.

At step 320, in response to a determination that the user input member slid from the first end of the slider to the second end of the slider, the user device 102 transmits a request to pay the bill to the provider computing system 104. The request includes a payment amount, a identifier of the bill being paid (e.g., the recipient of the payment, a user's customer number, an invoice number), an indication of the account the payment should be deducted from, and any other relevant information. The request is processed by the provider computing system 104 to carry out payment of the bill, which may include a transfer of funds from a user's account managed by the provider entity to a biller account managed by a third party. The request generated by the user device 102 in response to a user command made via the slider feature may therefore instruct the provider computing system 104 to use one or more APIs to carry out the transfer in concert with one or more third party systems 108.

Figure 18:
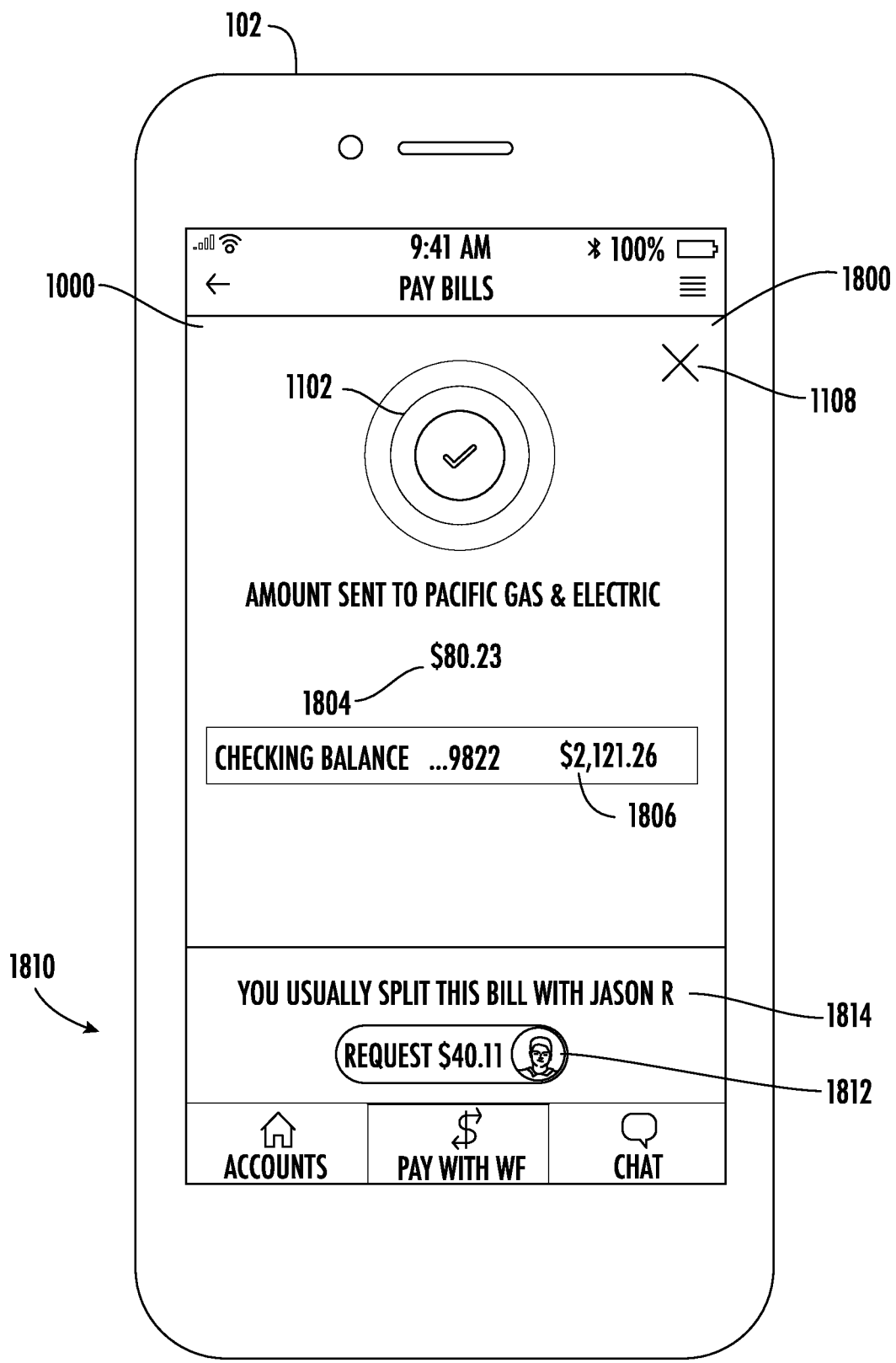
FIG. 18 is a sixth illustration in the series of a bill pay graphical user interface on the user device of FIG. 1, according to an example embodiment.

At step 322, the user device 102 receives a confirmation signal from the provider computing system 104 confirming that the bill has been paid or will be paid. For example, the provider computing system 104 may first receive such a confirmation of payment from a third party system 104 corresponding to the biller, and then forward that confirmation to the user device 102. At step 324, the user device 102 generates and provides to the user a confirmation page confirming payment of the bill. An example confirmation page is shown in FIG. 18 and described in detail below with reference thereto.

Referring now to FIG. 4, a process 400 for facilitating the splitting of a bill between the user and another person is shown, according to an example embodiment. Process 400 can be carried out by the user device 102 in communication with the provider computing system 104 and one or more consumer devices 108. Process 400 may pick up at the end of process 300, for example with step 404 described below contemporaneous with step 324 of FIG. 3.

At step 402, the user device 102 or the provider computing system 104 determines a bill split recommendation. The bill split recommendation is determined based on a user's historical transaction history relating to that bill and payment requests sent other people by the user or payments received by user from other people. Historical transaction data may be collected from usage data of user device 102 (i.e., by capturing transactions initiated by a user through inputs to user device 102) and/or from a history of transfers in-and-out of a user's accounts managed by the provider computing system 104 (i.e., by capturing amounts and parties involved in the moving of assets in and out of the user's accounts). The historical transaction data is mined to identify repeat correlations between a transfer out of a user's account for a particular amount and a close-in-time request for a fraction (e.g., one-half, one-third) of that amount from a third party or transfer into the user's account for a fraction of the amount. Notations included with a payment or request for payment (e.g., as in explanation 2008 shown in FIG. 20) may also be included in the data and used to identify a bill split in the historical data (e.g., when a payment or payment request is accompanied by an indication that states that it is for a portion of a bill).

For example, for consecutive months a user pays a utility bill using user device 102, and then shortly thereafter requests payment from the user's roommate for half of the amount of the utility bill via user device 102. Historical data for these transactions is collected and stored in the user device 102 or the provider computing system 104, and used to determine that the user splits bills from the utility company with the roommate (i.e., based on the fact that the user repeatedly requested an amount of money from the roommate close-in-time to the bill payment and that the amount requested was a consistent fraction of the amount of the bill payment). A bill split recommendation is thereby determined that recommends that a new bill from the utility bill also be split with the roommate.

At step 404, the user device 102 provides the bill split recommendation on a bill payment confirmation page, for example as generate at step 324 of FIG. 3. The user is thereby provided with the recommendation to split the bill with another person automatically and alongside a confirmation that the bill has been paid or will be paid. The bill split recommendation identifies a person that the bill will be split with and a recommended amount to apportion to that person. The bill split recommendation is presented as a user-selectable link or button on the graphical user interface, for example as shown in FIG. 18 and described in detail below with reference thereto. In various embodiments, the bill split recommendation is provided to the user on the user device 102 in one or more of a variety of other possible formats, including in a text message, email, push notification, etc.

In some embodiments, in addition to or alternatively to providing the bill split recommendation to the user, the bill split recommendation is automatically provided to the other person (i.e., the person determined as someone who might reimburse the user for a portion of the bill). For example, the provider computing system 104 may transmit an indication of the recommendation (e.g., a push notification, text message, email) to a consumer device 108 of the other person. A push notification, for example, is then presented on the consumer device 108 and informs the other person that the other person may wish to reimburse the user for a portion of a bill recently paid by the user. The other person can select the push notification to launch a graphical user interface configured to allow the other person to accept the recommendation and initiate a payment to the user. The user may thereby receive payment for a portion of the bill without having to ask the other person for payment, saving the user time, hassle, and social discomfort.

Figure 19:
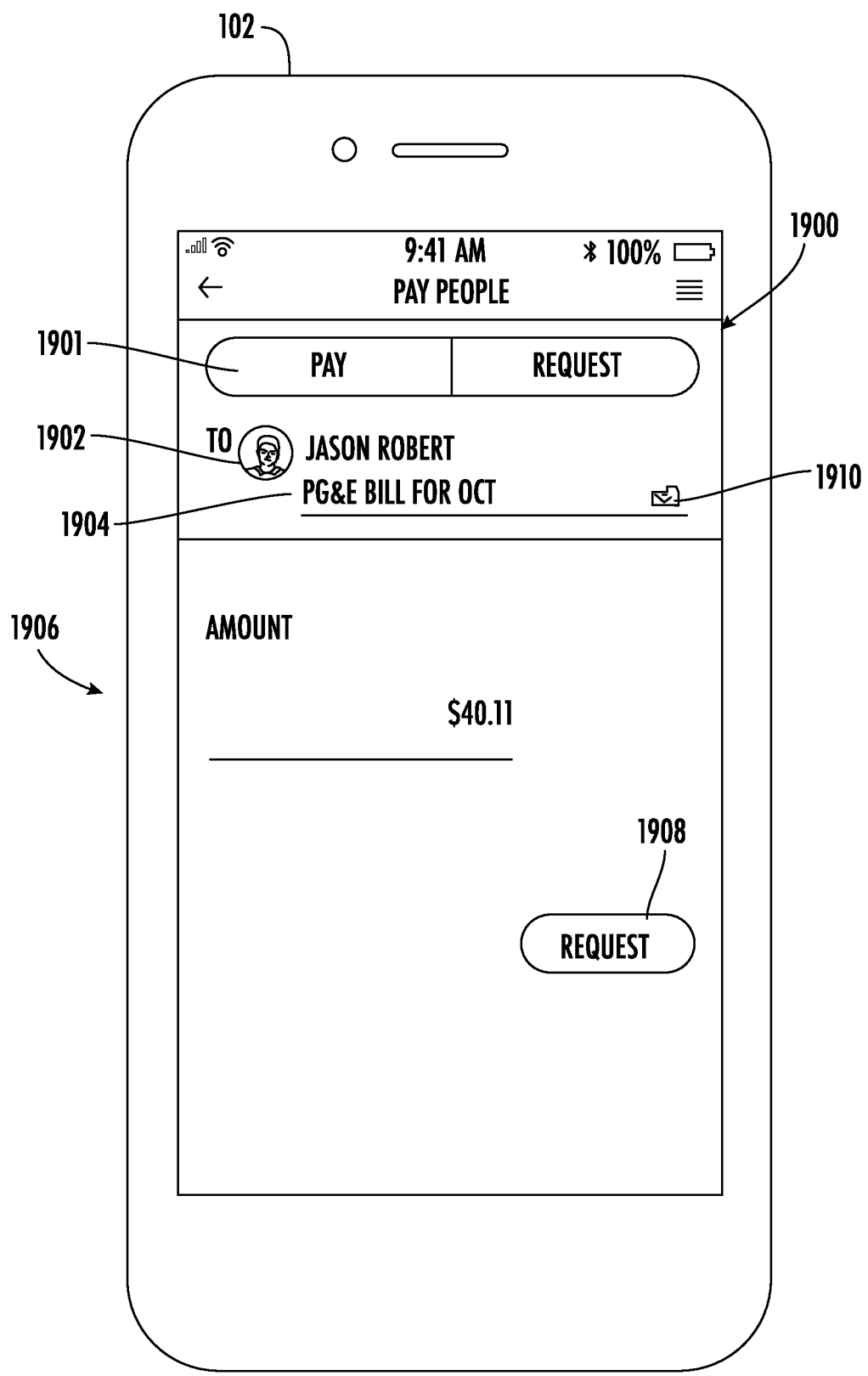
FIG. 19 is a first illustration of a pay people graphical user interface on the user device of FIG. 1, according to an example embodiment.

At step 406, the user device 102 receives a user selection (e.g., tap, touch) of the recommendation to split the bill. At step 408, the user device 102 generates and provides a request payment interface. The request payment interface allows the user to request payment from the person and for the amount identified by the bill split recommendation. The request payment interface allows the user to modify the request amount and the person from whom that amount is requested. An example of a request payment interface is shown in FIG. 19 and described in detail below with reference thereto.

At step 410, the user device receives a user command to request payment of the amount and from the person identified on the request payment interface. For example, the request payment interface may include a user-selectable button that can be pushed by a user to request payment, as shown in FIG. 19.

At step 412, the user device transmits the payment request to the provider computing system 104 and the consumer device 108 of the person from whom payment is requested. The provider computing system 104 forwards the request to the consumer device 108. The payment request identifies the amount requested and the person the amount is requested from.

Figure 20:
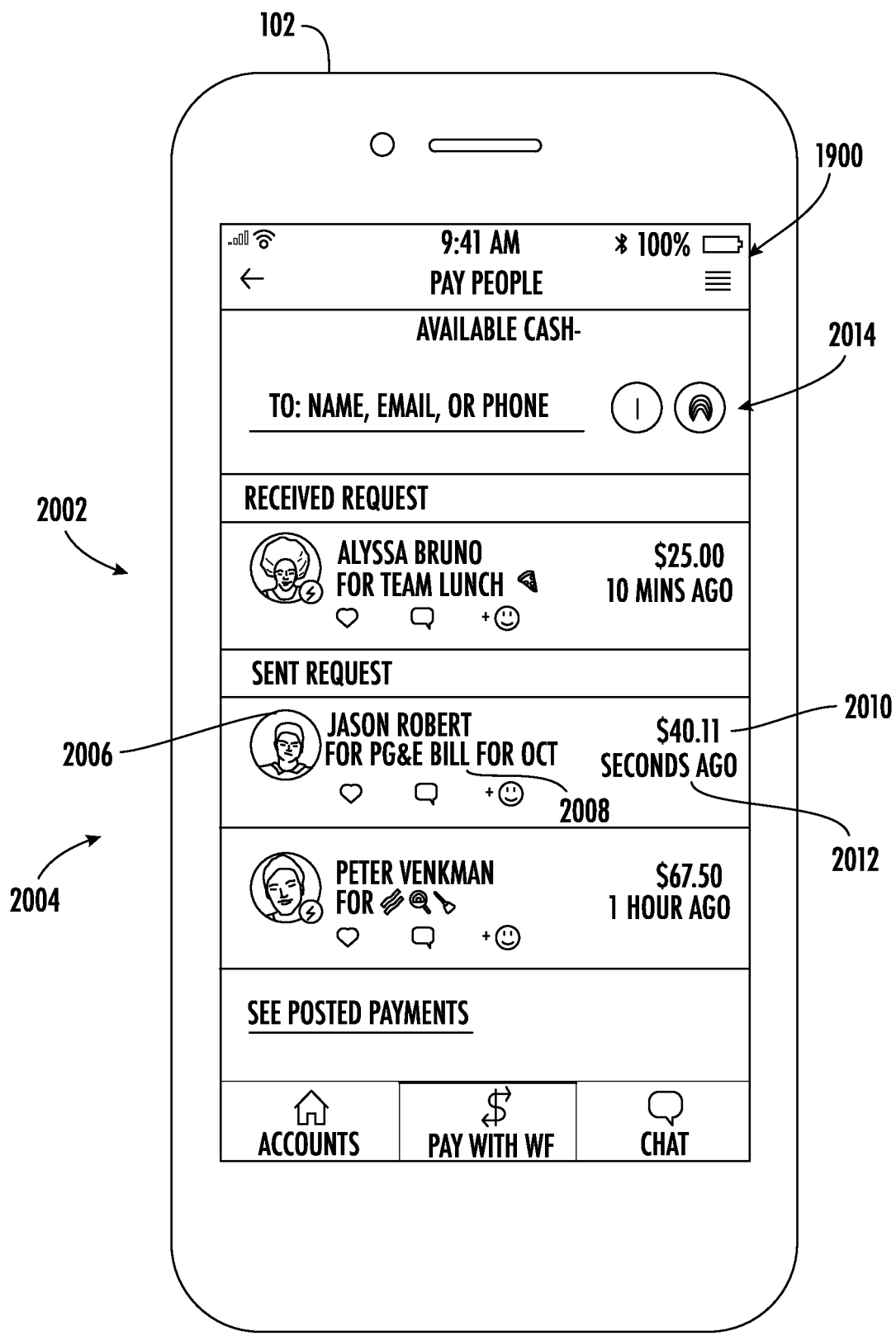
FIG. 20 is a second illustration of a pay people graphical user interface on the user device of FIG. 1, according to an example embodiment.

At step 414, the user device 102 generates and provides a list of pending requested payments to the user in a graphical user interface. An example of such a graphical user interface is shown in FIG. 20, and is described in detail with reference thereto.

Advantageously, the combination of process 300 and process 400 allows a user to select a bill from a list of bills, pay that bill, request a payment to split that bill with another user, and view a list of pending requested payments in as few as four inputs to the user device 102. This is a substantial improvement on previous personal computing devices that required a user to use multiple programs and various views to navigate to a particular biller's interface to pay a bill, input payment information, make a payment, receive a confirmation in a separate application (e.g., a confirmation email in an email inbox), open another application to request payment from another person to split the bill, look up that person from many possible recipients of a payment request, input the amount to be requested (after jumping back to the confirmation to double-check the amount, and perhaps opening a calculator application to calculate a split amount), and then finally request the split.

Referring now to FIGS. 5-20, example embodiments of graphical user interfaces generated by and displayed on user device 102 are shown in FIGS. 5-20. More particularly, FIGS. 5-11 are examples of interfaces generated in process 200, FIGS. 12-18 are examples of interfaces generated in process 300, and FIGS. 18-20 are examples of interfaces generated in process 400. It should be understood that various modifications may be made to the graphical user interfaces of FIGS. 5-20 without departing from the scope of processes 200, 300, and 400, and that the graphical user interfaces of FIGS. 5-20 may be used to facilitate operations and functions beyond those included in processes 200, 300, and 400.

FIG. 5 shows an example embodiment of a home page 500 as generated at step 202. The home page 500 includes a transfer money icon 502 that can be selected to launch a transfer mode, where money can be transferred between two of the user's accounts (e.g., a savings account and a checking account). The home page 500 also includes a send money icon 504 that can be selected to enter a person-to-person money transfer mode, a deposit check icon 506 that launches a mobile check deposit mode, a card free ATM icon 508 that launches a mode that allows a user to use user device 102 to request cash from an automated teller machine, a pay bills icon 510 that allows a user to enter a bill pay mode, and a mobile wallet icon 512 that launches a mobile wallet (e.g., Apple Pay).

The home page 500 also includes account information widget 514. Account information widget 514 shows an account name, an account number, and an available balance for that account, as received by the user device 102 from the provider computing system 104. By swiping on the account information widget 514 or touching arrow 516, information for a second account appears in the account information widget 514. The account information widget 514 thereby allows a user to view account details and balances for multiple accounts before selecting one of the icons 502-512.

Referring now to FIG. 6, a transfer mode interface 600 is shown, according to an example embodiment. As shown in the example embodiment of FIG. 6, the transfer mode interface 600 includes a transferee account widget 602 at the top of the transfer mode interface 600, a transfer amount field 604 located centrally on the transfer mode interface 600, a transferor account widget 606 located at the bottom of the transfer mode interface 600, and a slider feature 608 arranged between the transferor account widget 606 and the transferee account widget 602 alongside the transfer amount field 604. A transfer timing field 610 is positioned proximate the transfer amount field 604.

The transferee account widget 602 presents account information for an account that will receive transferred funds, while the transferor account widget 606 presents account information for an account that will provide the transferred funds. Accordingly, the transferee account widget 602 and the transferor account widget 606 each include an account name 612 (e.g., "Savings", "Checking"), an account number 614 (e.g., the last four digits of an account routing number), a bank indicator 616 (e.g., a logo for the bank, credit union, etc. holding that account), and an account balance 618 (i.e., an amount of money in the account). The transferee account widget 602 and the transferor account widget 606 can be swiped left or right to select between available accounts. In other words, a user can swipe the transferee account widget 602 to the left or right to change the account that will receive the transferred money, and can swipe the transferor account widget 606 to the left of right to change the account that will give up the transferred money. The account name 612, account number 614, bank indicator 616, and account balance 618 for all available accounts can thereby be accessed by the user, providing the user with the key information relevant to making a decision about which accounts to transfer money between and how much money to transfer.

The transfer timing field 610 indicates when a transfer of money will take place. As shown in FIG. 6, the transfer timing field 610 indicates "Instantly", meaning that a transfer of money between selected accounts will be initiated as soon as possible following the input of a user command to transfer money. The transfer timing field 610 can be selected by a user to launch a user interface widget that allows the user to schedule the transfer to occur at some time in the future (e.g., 24 hours later, on a particular date, after 5:00 p.m.). The transfer timing field 610 updates to show the schedule selected by the user. As shown in FIG. 6, "Instantly" is the default transfer timing setting.

The slider feature 608 allows a user to enter a command to transfer money from the account listed in the transferor account widget 606 to the account listed in the transferee account widget 602, as shown in detail in FIGS. 8-10 and described in detail with reference thereto. The slider feature 608 extends from a first end (origin) 620 to a second end (goal) 622 along a substantially straight slider path 624. The first end 620 is proximate the transferor account widget 606 and the second end 622 is proximate the transferee account widget 602. A tab 626 is positioned on the slider path 624 and is repositionable by a user along the slider path 624. The tab 626 is substantially confined to the slider path 624. The tab 626 is coin-shaped (i.e., circular) and includes a currency symbol (e.g., $, ¥, £, €) to evoke the impression that the tab 626 represents transferrable funds. The default position of the tab 626 is at the first end 620 of the slider feature 608. An arrow 628 indicates that the tab 626 can be slid by a user towards the second end 622.

The transfer amount field 604 indicates an amount of money to be transferred from the transferor account to the transferee account. As shown in FIG. 6, zero dollars is shown in the transfer amount field 604. The transfer amount field 604 can be selected by a user to launch number pad 700 as shown in FIG. 7.

Referring now to FIG. 7, the number pad 700 allows a user to select an amount to be transferred by typing in a number on the number pad 700. The selected amount is displayed in the transfer amount field 604. The number pad 700 is overlaid above other elements of the transfer mode interface 600, for example the transferor account widget 606 and the transfer timing field 610. The done button 702 can be selected by a user to hide the number pad 700 and proceed to the view shown in FIG. 8.

Referring now to FIG. 8, the transfer mode interface 600 is shown ready to accept a user command to transfer one hundred dollars from the user's savings account (shown in the transferor account widget 606) to the users checking account (shown in the transferee account widget 602. The tab 626 is positioned at the first end 620 of the slider path 624. To command the transfer to be made, the user touches the touchscreen 124 at the position of the tab 626 and slides along the slider path 624 towards the second end 622. The position of the tab 626 is adjusted to follow the contact point between the user (e.g., the user's finger, stylus) and the touchscreen 124, to create the impression that the user is sliding the tab 626 along the slider path 624. The arrow 628 may change positions along with the tab 626.

Referring now to FIG. 9, the tab 626 is shown at an intermediate position 900 between the first end 620 and the second end 622. The intermediate position 900 of the tab 626 indicates that a user input member (e.g., finger, stylus) slid from the first end 620 to the intermediate position 900 shown in FIG. 9. In FIG. 9, account balance fields 618 have been updated to show progress towards effecting the transfer by updating the account balance fields 618 proportionally to the portion of the slider path 624 traversed by the tab 626. That is, in this example where the intermediate position 900 is halfway between the first end 620 and the second end 622 and the amount to be transferred is one hundred dollars, fifty dollars have been subtracted from the account balance field 618 shown in the transferor account widget 606 and fifty dollars have been added to the account balance field 618 shown in the transferee account widget 602, communicating that the user is halfway to fully commanding the transfer to take place. The account balance fields 618 dynamically update as the tab 626 slides along the slider path 624 according to a formula: (starting available balance)±(transfer amount)*(distance from first end 620 to tab 626)/(distance from first end 620 to second end 622). In addition, the color of the slider path 624 may change (e.g., darken, fade) to indicate progress of the tab 626 along the slider path 624.

Referring now to FIG. 10, the transfer mode interface 600 is shown at the point of a fully commanded transfer. The tab 626 is at the second end 622 of the slider path 624. The account balance fields 618 show the transfer amount (here, one hundred dollars) fully switched from the account listed in the transferor account widget 606 to the account listed in the transferee account widget 602. In sum, the user slides the tab 626 from the first end (origin) 620 (e.g., as shown in FIG. 8) to the second end (goal) 622 (as shown in FIG. 10) to command the transfer of the amount listed in the transfer amount field 604 from the account in the transferor account widget 606 to the account in the transferee account widget 602. The relative arrangement of the transferor account widget 606, the transferee account widget 602, and the slider feature 608 create the impression that the user is sliding the money (represented by tab 626) from one account to the other, making the slider feature 608 intuitive for a user and easy to learn. The directionality of the slider feature 608 also helps to prevent an accidental flip-flop of the transferor and transferee accounts by the user (i.e., sending money the wrong way) by providing a visualization of how the money is moving from one account to the other. Additionally, because a user input of a slide from the first end 620 to the second end 622 is required for the transfer request to be made, a transfer request is relatively unlikely to be triggered by a user's misaimed tap of the touchscreen 124 or accidental bump of the touchscreen 124 as compared to an interface that accepts a request via a conventional button.

Referring now to FIG. 11, a confirmation page 1100 of the transfer mode interface 600 is shown. The confirmation page 1100 confirms that the requested transfer was made or that the transfer will be made when indicated in the transfer timing field 610. The confirmation page 1100 includes a success graphic 1102, an amount transferred indication 1104 (equivalent to the value shown in the transfer amount field 604) positioned below the success graphic 1102, and an updated balance 1106 for the account receiving the funds (the transferee account) positioned below the amount transferred indication 1104. In some embodiments, an updated balance is also shown for the account providing the funds (the transferor account). An exit icon 1108 is located in the upper right hand corner of the confirmation page 1100 and can be selected by a user to return to the home page 500 shown in FIGS. 5 and 12.

Figure 12:
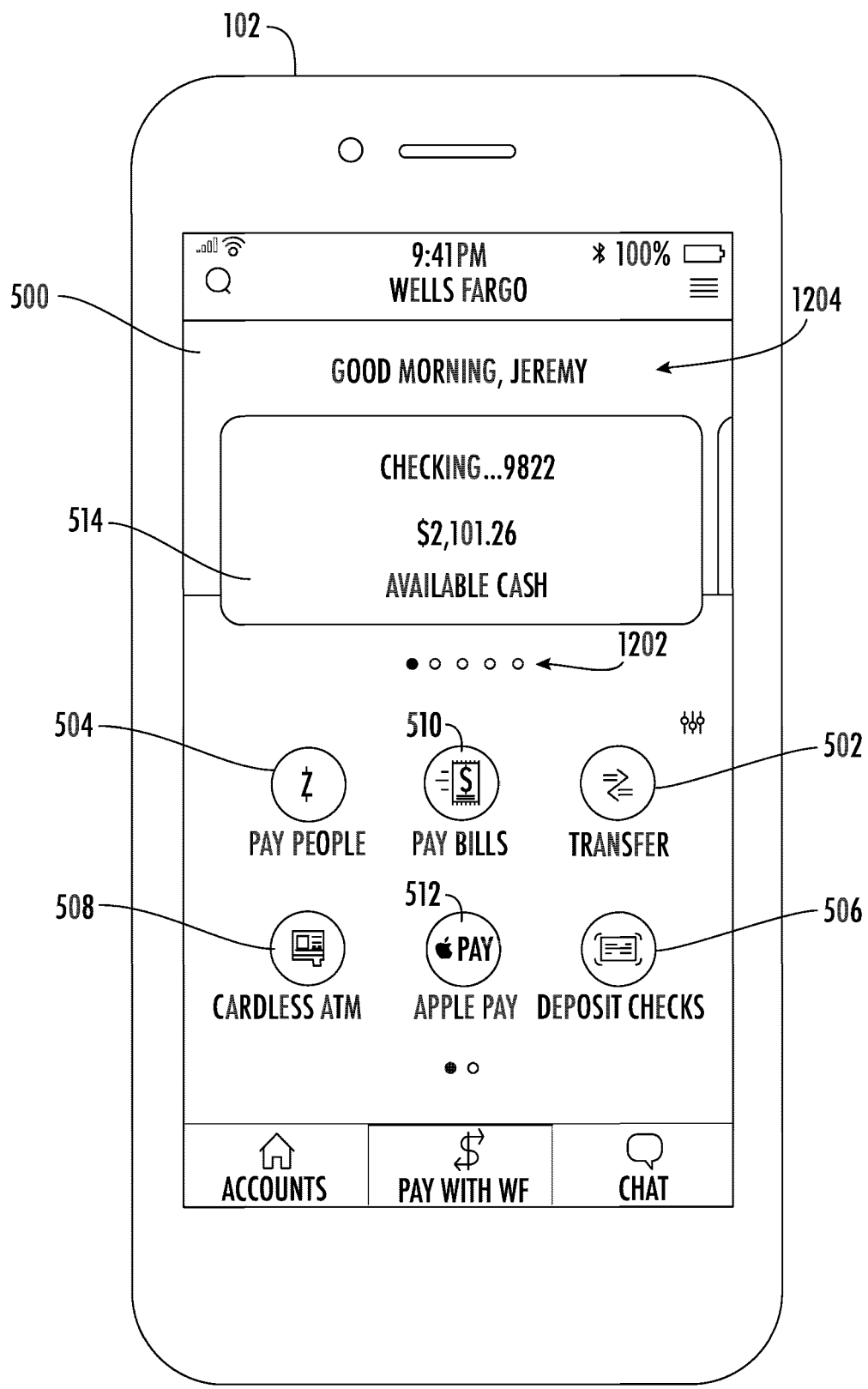
FIG. 12 is a second illustration of home screen on the user device of FIG. 1, according to an example embodiment.

Referring now to FIG. 12, another embodiment of the home page 500 of FIG. 5 is shown, according to an example embodiment. A friendly greeting 1204 is included at the top of the home page 500 to welcome the user. Below the friendly greeting 1204, the account information widget 514 can be swiped side to side to show account information for multiple accounts. As shown in FIG. 12, dots 1202 indicate that five accounts are viewable in the account information widget 514, with the four hidden accounts located to the right of the currently shown account (i.e., the other accounts are accessible by swiping to the left). As shown in FIG. 12, the home page 500 includes the transfer mode icon 502, pay people icon 504, deposit checks icon 506, cardless ATM icon 508, pay bills icon 510, and mobile wallet icon 512 arranged in a grid towards the bottom of the home page 500. The icons 502-512 may be rearranged by a user, for example so that the order of icons 502-512 shown in FIG. 12 is different than the order of icons 502-512 shown in FIG. 5. The icons 502-512 can be selected to enter corresponding features. For example, selection of the pay bills icon 510 causes the user device 102 to generate the bill pay interface 1300 shown in FIG. 13.

Referring now to FIG. 13, a bill pay interface 1300 is shown, according to an example embodiment. Bill pay interface 1300 includes a bill list 1302. Bill list 1302 includes an entry for each of several payments the user owes to third parties of a variety of types, such as credit card companies, utility companies, cell phone service providers, and landlords. The bill list 1302 thus includes payments owed to companies (that would traditionally paid directly to a company by check or on the company's website) as well as payments owed to individuals (e.g., other users of systems described herein). The bill list 1302 may show all bills with due dates within a certain amount of time (e.g., one week, two weeks). Each entry includes a biller name 1304, a biller logo 1306, a due date 1308, and an outstanding balance 1310. The bill list 1302 also includes a pay all button 1312 that can be selected to launch an interface that allows a user to simultaneously command payment of all bills on the bill list 1302. The bill pay interface 1300 also includes a search feature 1314 that allows a user to search for a person, business, etc. that the user wants to pay, and add that entity to the bill list 1302 or enter a view that allows the user to make a payment to that entity.

Referring now to FIG. 14, the bill pay interface 1300 is shown with a bill details pop-up 1400. The bill details pop-up 1400 can be accessed by a user by selecting an entry from the bill list 1302, for example by pressing on the entry in a particular way (e.g., holding down on the entry for an amount of time, pressing hard on a touchscreen 124 configured to differentiate between input pressures). The bill details pop-up 1400 obscures a portion of the bill list 1302. The bill details pop-up 1400 displays details about the bill, for example a payment history, due dates, a summary of reasons for the charges, an amount due, etc. The bill details pop-up 1400 allows the user to avoid going to the biller's website to get the detailed information the user may wish to see before paying the bill.

Referring now to FIG. 15, a payment view 1500 on the bill pay interface 1300 is shown, according to an example embodiment. Payment view 1500 can be reached by selecting an entry from the bill list 1302 and/or from the bill details pop-up 1400. Notably, the arrangement of features on the payment view 1500, as described below, is substantially similar to the arrangement of features on the transfer interface 600 shown in FIGS. 6-10. For example, the transferor account widget 606 and the slider feature 608 are used in both the transfer interface 600 and the payment view 1500. The user experience across types of money transfers (e.g., between a user's own accounts, from a user to a company, from a user to a person) is unified to promote usability and learnability and to reduce errors in using the various interfaces. The repeated interface features and elements may also reduce data storage and processing burdens on the user device 102 by reducing the number of different visualizations the user device 102 is expected to generate.

A biller field 1502 is positioned at the top of the payment view 1500, a payment amount field 1504 is located below the biller field 1502 and centrally on the payment view 1500, and a transferor account widget 606 is positioned at the bottom of the payment view 1500. The slider feature 608 is positioned between the transferor account widget 606 and the biller field 1502. A payment timing field 1510 is positioned proximate the payment amount field 1504.

The biller field 1502 includes information relating to the bill to be paid by the user, including a biller name (e.g., a company, a person), a bill identifier (e.g., bill number, user customer number), and a total amount due 1520. A drop-down selection 1503 can be selected to view more details about the bill, including, for example, a payment history and a due date.

The transferor account widget 606 presents account information for an account that will provide the transferred funds. Accordingly the transferor account widget 606 includes an account name 1512 (e.g., "Checking"), an account number 614, a bank indicator 616, and an account balance 1518. The transferor account widget 606 can be swiped left and right by the user to select between available accounts (e.g., to switch from the user's checking account to the user's savings account; to switch from the user's checking account with a first bank to the user's checking account with a second bank). The account balance 618 for all available accounts can thereby be viewed by the user on the transfer mode interface 600 to allow the user to choose which account to use to make the payment without having to access account information in a separate view or application.

The payment timing field 1510 indicates when a payment of the bill will take place. As shown in FIG. 15, the payment timing field 1510 indicates "Instantly", meaning that the payment will be executed as soon as possible following the input of a user command to make the payment. The payment timing field 1510 can be selected by a user to launch a user interface widget that allows the user to schedule the transfer to occur at some time in the future (e.g., a day after payday). The transfer timing field 1510 updates to show the schedule selected by the user.

The payment amount field 1504 indicates the amount of money to be paid to the biller from the account shown in the transferor account widget 606. The payment amount field 1504 is auto-populated to match the total amount due 1510 shown in the biller field 1502. The payment amount field 1504 can be selected (e.g., tapped, touched) by a user to launch a number pad that can be used to edit the payment amount shown in the payment amount field 1504 (for example as shown in FIG. 7).

The slider feature 608 allows a user to enter a command to make a payment from the account shown in the transferor account widget 606 to the entity shown in the biller field 1502 for the amount shown in the payment amount field 1504 by sliding the tab 626 from the first end (origin) 620 to the second end (goal) 622 of the slider feature 608 along the slider path 624. The first end 620 is proximate the transferor account widget 606 and the second end 622 is proximate the biller field 1502. The tab 626 is positioned on the slider path 624 and is repositionable by a user along the slider path 624. The default position of the tab 626 is at the first end 620 of the slider feature 608. An arrow 628 indicates the tab 626 can be slid by a user towards the second end 622 (i.e., towards the biller field 1502.

A shown at FIG. 15, the payment view is ready to accept a user command to pay $80.23 from the user's checking account to Pacific Gas & Electric to fully pay off an amount due of $80.23. To command the payment to be made, the user touches the touchscreen 124 at the position of the tab 626 and slides along the slider path 624 towards the second end 622. The position of the tab 626 is adjusted to follow the contact point between the user (e.g., the user's finger, stylus) and the touchscreen 124, to create the impression that the user is sliding the tab 626 along the slider path 624. The arrow 628 may change positions along with the tab 626.

Referring now to FIG. 16, the tab 626 is shown at an intermediate position 900 between the first end 620 and the second end 622. The intermediate position 900 of the tab 626 indicates that a user input member (e.g., finger, stylus) slid from the first end 620 to the intermediate position 900 shown in FIG. 16. In FIG. 16, the account balance field 618 and the amount due 1510 in the biller field 1502 have been update to show progress towards effecting the transfer by modifying the vales proportionally to the portion of the slider path 624 traversed by the tab 626. That is, in the example of FIG. 16 where the intermediate position 900 is roughly halfway between the first end 620 and the second end 622 and the amount to be transferred is $80.23, forty dollars have been removed from the amount due 1510 and from the account balance field 618, communicating that the user is halfway to fully commanding the payment to be executed. The account balance field 618 and the amount due 1510 are dynamically updated as the tab 626 slides along the slider path 624 according to a formula: (original balance or amount due)−(payment amount)*(distance from first end 620 to tab 626)/(distance from first end 620 to second end 622). In addition, the color of the slider path 624 may change to indicate progress of the tab 626 along the slider path 624. The tab 626 can be slide up the slider path 624 until the tab 626 reaches the second end 622 as shown in FIG. 6.

Referring now to FIG. 17, the payment view 1500 is shown at the point of a fully commanded payment. The tab 626 is at the second end 622 of the slider path 624. The full $80.23 has been deducted from both the account balance field 618 and the amount due 1520. The zero value at the amount due 1520 communicates to the user that the bill has been paid in full. In sum, the payment view 1500 is configured such that the user slides the tab 626 from the first end (origin) 620 as shown in FIG. 15 to the second end (goal) 622 as shown in FIG. 17 to command the payment of the amount listed in the payment amount field 1504 from the account shown in the transferor account widget 606 to the biller shown in the biller field 1502. The relative arrangement of the transferor account widget 606, the biller field 1502, and the slider feature 608 create the impression that the user is sliding or pushing the money (represented by tab 626) from the user's account to the biller, making the slider feature 608 intuitive and easy to learn. Additionally, because a user input of a slide from the first end 620 to the second end 622 is required for the payment to be made, an accidental payment is relatively unlikely to be triggered by a user's misaimed tap of the touchscreen 124 or accidental bump of the touchscreen 124 as compared to an interface that accepts a payment command via a conventional button.

Referring now to FIG. 18, payment confirmation page 1800 is shown, according to an example embodiment. Payment confirmation page 1800 confirms that the requested payment was made or that the payment will be made when indicated in the payment timing field 1510. The confirmation page 1800 includes a success graphic 1102, an amount paid indication 1804 (equivalent to the value shown in the payment amount field 1504) positioned below the success graphic 1102, and an updated balance 1806 for the account providing the money for the payment. An exit icon 1108 is located in the upper right hand corner of the payment confirmation page 1800 and can be selected by a user to return to the home page 500 shown in FIGS. 5 and 12.

The payment confirmation page 1800 also includes a split recommendation 1810. The split recommendation 1810 indicates that the user device 102 and/or the provider computing system 104 have determined that the user usually splits the bill just paid by the user with another person. The split recommendation 1810 includes a request payment button 1812 and an explanation 1814 of why the request button 1812 is provided (e.g., "You usually split this bill with Jason"). The request payment button 1812 can be selected by the user to navigate to the pay people view 1900 shown in FIG. 19.

Referring now to FIG. 19, a pay people view 1900 is shown, according to an example embodiment. As shown in FIG. 19, the pay people view 1900 is in a payment request mode as indicated by toggle 1901 that allows the pay people view 1900 to switch between a payment request mode (to request payment from others) and a payment mode (to send money to others). The pay people view 1900 includes a request recipient identifier 1902, a request explanation field 1904, a request amount 1906 located centrally on the pay people view 1900 (i.e., positioned like the payment amount field 1504 and the transfer amount field 604), and a request button 1908. The recipient identifier 1902 includes the name of the recipient of the request adjacent to a picture of the recipient. The recipient is auto-filled as identified in the split recommendation 1810. The request explanation field 1904 includes a text-based explanation of the basis for the request (e.g., "PG&E bill for Oct."). The request explanation field 1904 is auto-populated based on the split recommendation 1810 (e.g., to identify the bill being split). The user can edit the request explanation field 1904 by touching or tapping the request explanation field 1904 to launch a graphical keyboard configured to allow a user to type characters, emojis, etc. into the request explanation field 1904. The request explanation field 1904 also includes a camera button 1910 that can be selected by a user to allow the user to take or upload a photo relating to the payment request (e.g., a photo/screenshot of the bill).

The request amount field 1906 is auto-populated based on the split recommendation 1810. Here, the split recommendation 1810 includes a determination that the bill is usually split evenly with the recipient, so the request amount field 1906 includes a value $40.11 that is half of the payment amount $80.23, rounded down to the nearest cent.

The request button 1908 can be selected (e.g., tapped, touched) by the user to make the request as shown on the pay people view 1900. In response to a selection of the request button 1908, the user device 102 transmits the request to the provider computing system 104 and/or a consumer device 108 of the recipient.

Referring now to FIG. 20, a pay people list view 2000 is shown, according to an example embodiments. The pay people list view 2000 includes a list of pending received requests 2002 (i.e., requests for the user to pay money to someone) and a list of pending sent request 2004 (i.e., requests for someone to pay the user, for example as requested from pay people view 1900 of FIG. 19). Entries in both lists 2002, 2004 on the pay people list view 2000 include a person identifier 2006, an explanation 2008, an amount 2010, and an duration of time 2012 since the request was made. Interactive features are provided on the pay people list view 2000 that allow the user to comment on, "like", react to, edit, or otherwise interact with the listed requests. A search feature 2014 is configured to allow the user to search for people to pay or request payment from based on name, email, or phone number, or by physical proximity.

Thus, the user device 102 shown in FIGS. 12-20 provides a smooth transition from a bill payment mode (e.g., to pay a utility company) into a pay people mode with full functionality to send and request payments between individuals while social interactions relating to those payment requests. More particularly, from the home page 500 shown at FIG. 12, a user can view a list of bills, pay a bill, and split that bill with a friend in a few as five inputs to the user device 102. Interactions with personal computing devices relating to bill payment and money management are thus substantially streamlined, made more efficient, and made easier to use than in conventional approaches.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
generating a graphical user interface, the graphical user interface comprising:
  a transferor account widget that is selectable to select a transferor account, the transferor account widget positioned proximate a first edge of the graphical user interface and having a numerical indicator regarding a balance in the transferor account;
  a transferee account widget that is selectable to select a transferee account, the transferee account widget positioned proximate a second edge of the graphical user interface;
  a transfer amount field configured to receive an input regarding an amount of funds to transfer from the transferor account to the transferee account; and
  a slider feature positioned between the transferor account widget and the transferee account widget, the slider feature having an origin positioned proximate the transferor account widget, a goal positioned proximate the transferee account widget, and a slider path extending from the origin to the goal;
detecting a slide of a user input member along the slider path from the origin to the goal;
determining a distance traversed by the user input member between the origin and the goal along the slider path;
reducing the numerical indicator regarding the balance in the transferor account based on the distance traversed by the user input member between the origin and the goal; and
in response to detecting the slide of the user input member along the slider path from the origin to the goal, initiating and completing a transfer from the transferor account to the transferee account of the amount of funds based on the user input member reaching the goal along the slider path.

2. The method of claim 1, wherein the slider feature further comprises a tab, the tab confined to the slider path and slideable along the slider path from the origin to the goal.

3. The method of claim 1, the method further comprising:
detecting a swipe of the transferor account widget by the user input member; and
in response to detecting the swipe of the transferor account widget, updating the transferor account widget to show an alternative account as the transferor account.

4. The method of claim 1, further comprising:
receiving a confirmation of the transfer of funds from the transferor account to the transferee account;
providing a confirmation page in the graphical user interface.

5. A user device, comprising:
a touchscreen; and
an application circuit, the application circuit structured to:
  provide, on the touchscreen, a graphical user interface comprising:
    a transferor account widget that is selectable to select a transferor account, the transferor account widget positioned proximate a first edge of the touchscreen and having a numerical indicator regarding a balance in the transferor account;
    a transferee account widget that is selectable to select a transferee account, the transferee account widget positioned proximate a second edge of the touchscreen;
    a transfer amount field configured to receive an input regarding an amount of funds to transfer from the transferor account to the transferee account; and
    a slider feature positioned between the transferor account widget and the transferee account widget, the slider feature having an origin positioned proximate the transferor account widget, a goal positioned proximate the transferee account widget, and a slider path extending from the origin to the goal;
  detect a slide of a user input member on the touchscreen along the slider path from the origin to the goal;
  determine a distance traversed by the user input member between the origin and the goal along the slider path;
  reduce the numerical indicator regarding the balance in the transferor account based on the distance traversed by the user input member between the origin and the goal; and
  in response to detecting the slide of the user input member along the slider path from the origin to the goal, initiate and complete a transfer from the transferor account to the transferee account of the amount of funds based on the user input member reaching the goal along the slider path.

6. The user device of claim 5, wherein the slider feature further comprises a tab, the tab confined to the slider path and slideable along the slider path from the origin to the goal.

7. The user device of claim 5, the application circuit structured to:
   detect a swipe of the transferor account widget by the user input member; and
   in response to detecting the swipe of the transferor account widget, update the transferor account widget to show an alternative account as the transferor account.

8. The user device of claim 5, wherein the application circuit is further structured to receive a confirmation of the transfer of funds from a provider computing system; and
   in response to receiving the confirmation, provide, on the touchscreen, a confirmation page confirming the transfer.

\* \* \* \* \*